US012780242B2

(12) United States Patent
Sane et al.

(10) Patent No.: US 12,780,242 B2
(45) Date of Patent: Nov. 3, 2026

(54) PERCEPTION CONFIDENCE

(71) Applicant: NVIDIA Corporation, Santa Clara, CA (US)

(72) Inventors: Harshad Sane, Santa Clara, CA (US); Maroof Mohammed Farooq, Santa Clara, CA (US); Sangmin Oh, San Jose, CA (US); Mehmet Kocamaz, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 228 days.

(21) Appl. No.: 18/391,334

(22) Filed: Dec. 20, 2023

(65) Prior Publication Data

US 2025/0206331 A1 Jun. 26, 2025

(51) Int. Cl.
*B60W 60/00* (2020.01)
*B60W 50/02* (2012.01)

(52) U.S. Cl.
CPC ...... *B60W 60/001* (2020.02); *B60W 50/0205* (2013.01); *B60W 2050/0215* (2013.01); *B60W 2420/403* (2013.01); *B60W 2556/10* (2020.02)

(58) Field of Classification Search
None
See application file for complete search history.

(56) References Cited

U.S. PATENT DOCUMENTS

| | | | | |
|---|---|---|---|---|
| 9,465,388 | B1 * | 10/2016 | Fairfield | B60W 60/0059 |
| 10,310,509 | B1 * | 6/2019 | Ferguson | G05D 1/024 |
| 10,860,899 | B2 * | 12/2020 | Porta | B60R 1/23 |
| 11,170,299 | B2 * | 11/2021 | Kwon | G06N 3/08 |
| 11,210,537 | B2 * | 12/2021 | Koivisto | G01S 7/417 |
| 11,550,044 | B2 * | 1/2023 | Kudla | G01S 7/4817 |
| 11,610,115 | B2 * | 3/2023 | Kar | G06N 3/08 |
| 12,235,396 | B1 * | 2/2025 | Terefe | B60S 1/54 |
| 12,271,204 | B1 * | 4/2025 | Garimella | B60W 60/00 |
| 2016/0370801 | A1 * | 12/2016 | Fairfield | B60W 60/0059 |
| 2018/0143298 | A1 * | 5/2018 | Newman | G06Q 30/0266 |
| 2018/0267558 | A1 * | 9/2018 | Tiwari | G05D 1/0038 |
| 2018/0342113 | A1 * | 11/2018 | Kislovskiy | G07C 5/008 |
| 2019/0258878 | A1 * | 8/2019 | Koivisto | G01S 7/417 |
| 2020/0160178 | A1 * | 5/2020 | Kar | G06N 3/08 |
| 2020/0292679 | A1 * | 9/2020 | Osiroff | B60S 1/02 |
| 2021/0197859 | A1 * | 7/2021 | Canady | B60S 1/56 |
| 2022/0179057 | A1 * | 6/2022 | Shotan | G01S 17/42 |
| 2023/0303114 | A1 * | 9/2023 | Tian | B60W 50/0205 |
| 2024/0274000 | A1 * | 8/2024 | Malhan | G08G 1/0133 |
| 2025/0342657 | A1 * | 11/2025 | Paus | B60W 30/0956 |

* cited by examiner

*Primary Examiner* — Jonathan M Dager
(74) *Attorney, Agent, or Firm* — Sanders IP Law

(57) ABSTRACT

Embodiments of the present disclosure may include a method and system for performing one or more operations based on a visibility confidence model. In some embodiments, the method may include generating a visibility confidence model which may indicate a level of confidence in sensor data that may correspond to individual sub-sections of an aggregate field of view. In some embodiments, the levels of confidence may be determined based on one or more errors associated with an individual sensor, one or more gross-level degradations, one or more fine-level degradations, or one or more occlusions being present in the sensor data. In some embodiments, the method may additionally include performing one or more operations based on the visibility confidence model or the level of confidence corresponding to individual sub-areas of the aggregate field of view.

20 Claims, 11 Drawing Sheets

PERCEPTION CONFIDENCE

BACKGROUND

Autonomous driving systems and advanced driver assistance systems (ADAS) may leverage various sensors (e.g., cameras, LiDAR, RADAR, etc.) to perform various tasks-such as lane keeping, lane changing, lane assignment, camera calibration, and/or localization. For example, for autonomous and ADAS systems to operate independently and efficiently, an understanding of the surrounding environment of the vehicle in real-time or near real-time may be generated. To accurately and efficiently understand the surrounding environment of the vehicle, it is important for associated sensors to generate usable, unobscured sensor data (e.g., images, depth maps, etc.). However, an ability of the respective sensors to perceive the surrounding environment may be compromised by a variety of sources-such as sensor blockage (e.g., from debris, precipitation, etc.), blur, occlusion, etc.—which may lead to sensor blindness. Further, blockage, blur, and/or other obscured sensor data associated with a single sensor may decrease an ability of one or more machines to perceive an environment, even when the machine includes multiple sensors or may obtain sensor data corresponding to multiple sensors. In some instances, potential causes of sensor blindness may include snow, rain, glare, sun flares, mud, water, signal failure, and/or the like.

One or more traditional approaches to determining sensor blindness, blur, obstruction, etc. include performing confidence modelling or degradation modelling on a particular sensor, for example, predicting and/or determining how a sensor will degrade based on time, environmental conditions, etc. However, a limitation of such an approach is that other systems—such as, for example, planning systems, obstacle fusion systems, tracking systems, etc.—may not be able to easily query individual models corresponding to individual sensors prior to making one or more determinations and/or generating one or more control commands. This limitation is increased in systems including multiple sensors corresponding to multiple corresponding sensor modalities.

SUMMARY

According to one or more embodiments of the present disclosure, one or more visibility systems, sub-systems, machine models, neural networks, etc. may be used to generate one or more visibility confidence models associated with sensor data corresponding to multiple sensors. In some embodiments, the visibility model may include one or more data structures and/or visual representations of the one or more aggregate fields of view. For example, the visibility confidence model may include or be represented using a top-down view of the aggregate field of view as indicated using the sensor data.

In some embodiments, the visibility confidence model may indicate a level of confidence in sensor data that may correspond to individual sub-sections of the aggregate field of view. In some embodiments, the individual fields of view corresponding to the aggregate field of view may respectively define potential spatial coverage of sensor data that may correspond to one or more sensors associated with a machine.

In some embodiments, the respective levels of confidence associated with the visibility confidence model may be determined based on one or more faults or errors associated with an individual sensor of the one or more sensors corresponding to the machine. In some embodiments, the one or more faults or errors may additionally point to whether the sensor is "healthy" or functioning properly. In some embodiments, the presence of one or more errors and/or faults may indicate broadly that the sensor may not be functioning properly (e.g., the sensor is not electrically coupled to the machine, the sensor no longer generates sensor data, etc.).

In some embodiments, the respective levels of confidence may additionally be determined based on one or more gross-level degradations and/or blockages associated with the sensor and/or the sensor data corresponding to the sensor. In some embodiments, the gross-level degradations and/or blockages may include one or more blockages that may apply to all of the sensor data associated with the sensor. Additionally or alternatively, the respective levels of confidence may be determined based on one or more fine-level degradations corresponding to the sensor data. The fine-level sensor degradations may include one or more blockages that may apply to a portion of the sensor data generated using the sensor.

In some embodiments, the method may additionally include identifying one or more occlusions that may be present in the sensor data that may correspond to one or more individual subsections of the aggregate field of view. In some embodiments, the method may additionally include performing one or more operations based on the visibility confidence model and/or the level of confidence corresponding to individual sub-areas of the aggregate field of view.

Embodiments of the present disclosure may increase an ability of a system to make one or more control decisions based on reliable sensor data by generating a data structure from which one or more systems, subsystems, control systems, etc. may obtain confidence information corresponding to a particular location. Further, in some embodiments, by generating a visibility confidence model that is centered on an origin or reference frame corresponding to the machine, and corresponds to an aggregate field of view of a particular sensor modality, one or more systems may improve their effectiveness in making informed control determinations in view of potential sensor blockages, visibility distance degradations, occlusions, and/or the like.

BRIEF DESCRIPTION OF THE DRAWINGS

The present systems and methods correspond to generating one or more visibility confidence models corresponding to sensor data, wherein.

DETAILED DESCRIPTION

Figure 1:
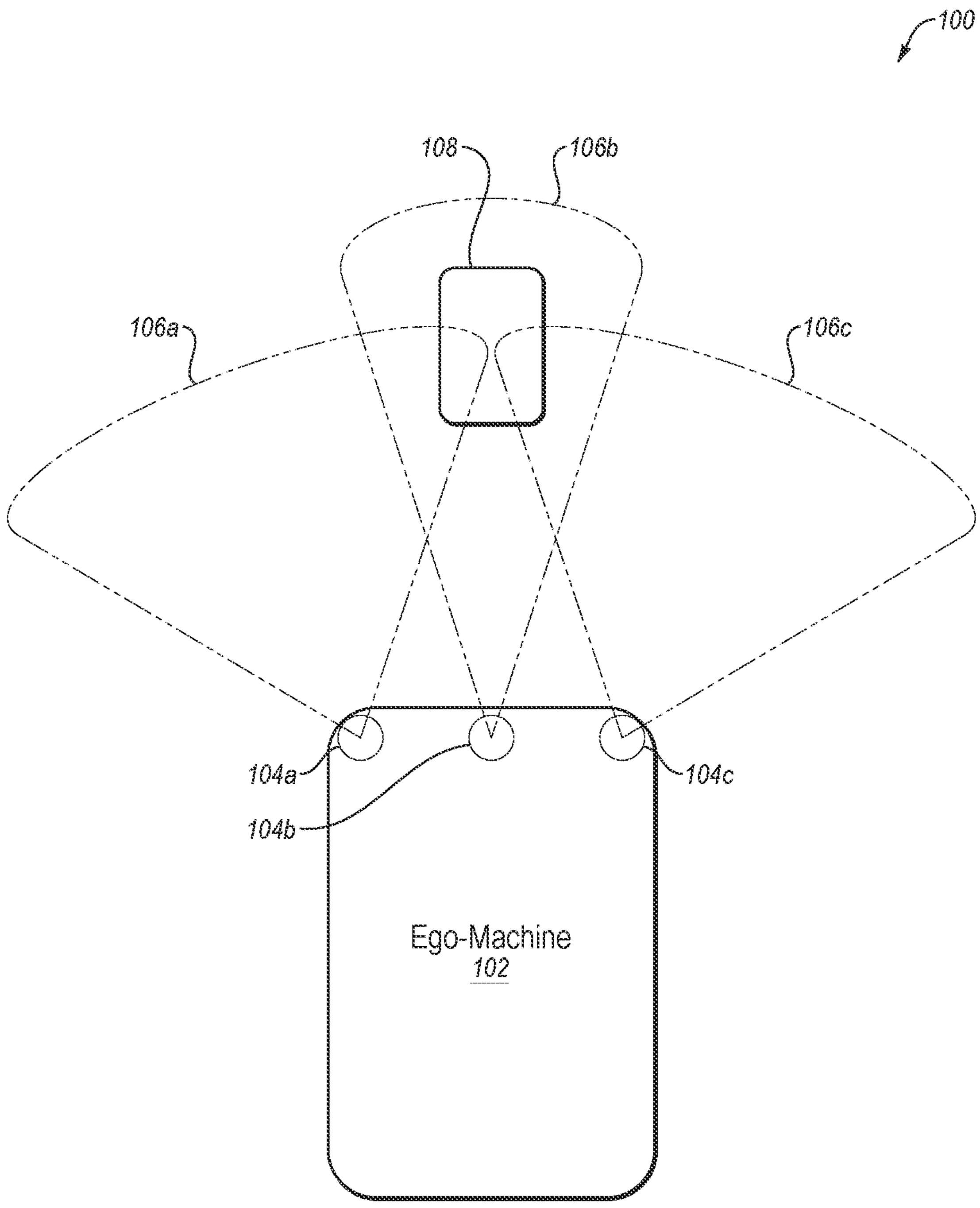
FIG. 1 is a diagram representing an example environment related to multiple sensors generating sensor data corresponding to respective fields of view or sensory fields, in accordance with one or more embodiments of the present disclosure.

One or more embodiments of the present disclosure may relate to generating a data structure, a model, and/or another representation that may include information corresponding to a level of confidence in sensor data defining one or more fields of view or sensor fields. In non-limiting embodiments, this representation may include or be referred to as a "visibility confidence model." In some embodiments, one or more visibility systems, sub-systems, machine models, neural networks, etc. may be configured to generate one or more visibility confidence models associated with sensor data corresponding to the one or more aggregate fields of view.

In some embodiments, reference to a particular field of view or sensor field may indicate potential spatial coverage of sensor data corresponding to an individual sensor. The potential spatial coverage identified by one or more inherent characteristics of the individual sensor; such as, for example, focal length, lens size, lens type, mirror diameter, aperture size, scan density, resolution, transmission power, antenna size, transmission to reception power ratio, etc. For example, a particular image sensor may generate image data representing a particular portion of an environment that corresponds to (e.g., is within) a particular field of view of the particular image sensor. Similarly, a particular LiDAR sensor may generate LiDAR data that represents or corresponds to a particular portion of the environment that is within the sensor field or field of view of the LiDAR sensor (which may include a 360-degree scan).

In some embodiments, an aggregate field of view may be generated based on potential spatial coverage of sensor data corresponding to multiple sensors. The aggregate field of view may include a combination of the individual fields of views of the sensors such that, in at least some instances, the aggregate field of view may provide a larger field of view as compared with any one of the individual fields of view used to generate the aggregate field of view. For example, in the context of an ego-machine, the ego-machine may include multiple cameras where each of the cameras may be configured to generate sensor data corresponding to respective fields of view. Continuing the example, the aggregate field of view may refer to an aggregation of respective fields of view or sensor fields associated with respective cameras and/or other sensor modalities corresponding to the ego-machine.

According to one or more embodiments of the present disclosure, one or more visibility systems, sub-systems, machine models, neural networks, etc. may be configured to generate one or more visibility confidence models associated with sensor data corresponding to the one or more aggregate fields of view. In some embodiments, the visibility confidence model may include one or more data structures and/or visual representations of the one or more aggregate fields of view. For example, the visibility confidence model may include a representation of a top-down view or birds-eye-view (BEV) of the aggregate field of view as indicated using the sensor data. Additionally or alternatively, embodiments of the present disclosure may include generating a query and/or otherwise requesting and/or retrieving data and/or information from the data structure. Further, the data and/or information that may be received may additionally be used in generating one or more control determinations.

In some embodiments, the visual representation(s) and/or data structures may be subdivided into one or more sub-sections of the aggregate field of view. In some embodiments, the one or more sub-sections may represent respective portions of the aggregate field of view. In some embodiments, the respective portions of the aggregate field of view may include portions of the volume defined by the aggregate field of view. For example, the aggregate field of view may be represented by sensor data corresponding to an area or volume associated with a machine. Continuing the example, the aggregate field of view may be subdivided into one or more sub-sections, and, in some embodiments, the aggregate field of view may be represented by a visibility confidence model indicating a respective confidence in sensor data corresponding to respective sub-sections of the aggregate field of view.

In some embodiments, the visibility confidence model may indicate a level of confidence in sensor data corresponding to individual sub-sections of the aggregate field of view. In some embodiments, a low level of confidence may indicate that the machine may not rely on the data corresponding to a particular sub-section of the aggregate field of view. Additionally or alternatively, a low level of confidence may indicate that the machine should rely on data corresponding to one or more other sensor modalities in an instance where the machine is receiving conflicting data with respect to the particular sub-section of the aggregate field of view. In some embodiments, the visibility confidence model may be a data structure that may be queried by one or more other systems, subsystems, processing units, etc.

One or more of the embodiments disclosed herein may relate to generating and/or querying a data structure indicating levels of visibility corresponding to an environment in which an ego-machine may be located. In some embodiments, the ego-machine may be configured to generate the data structure and/or generate one or more queries to the data structure, where the data and/or information associated with and/or included in the data structure may assist the ego-machine in navigating a particular environment. In some embodiments, the ego-machine may include any applicable machine or system that is capable of performing one or more autonomous and/or semi-autonomous operations. Example ego-machines may include, but are not limited to, vehicles (land, sea, space, and/or air), robots, robotic platforms, etc.

By way of example, the ego-machine computing applications may include one or more applications that may be executed by an autonomous vehicle or semi-autonomous vehicle, such as an example autonomous or semi-autonomous vehicle or machine 500 (alternatively referred to herein as "vehicle 500" or "ego-machine 500) described with respect to FIGS. 5A-5D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems that implement one or more language models, such as one or more large language models (LLMs) that process textual, audio, image, sensor, and/or other data types to generate one or more outputs, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Now referring to FIG. 1, FIG. 1 is a diagram representing an example environment 100 related to multiple sensors 104 generating sensor data corresponding to respective fields of view (or sensory fields) 106, in accordance with one or more embodiments of the present disclosure. In some embodiments, the example environment 100 may include a physical area in which an ego-machine 102 may be located—although a virtual or simulated environment may be used for testing/validation purposes, in embodiments. In some embodiments, the sensors 104 may correspond to the ego-machine 102 (e.g., the sensors 104 may be located or disposed on or in the ego-machine 102) and may generate sensor data corresponding to one or more fields of view 106.

The ego-machine 102 may include one or more machines that may be configured to receive or otherwise obtain sensor data corresponding to one or more sensors 104. In some embodiments, the ego-machine 102 may include one or more machines that may navigate a particular environment based at least on sensor data corresponding to one or more sensors 104. In some embodiments, the ego-machine 102 may include any applicable machine or system that is capable of performing one or more autonomous or semi-autonomous operations. For example, the ego-machine 102 may include an autonomous vehicle or semi-autonomous vehicle, such as an example autonomous or semi-autonomous machine or vehicle 500 (alternatively referred to herein as "vehicle 500" or "ego-machine 500") described with respect to FIGS. 5A-5D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

In some embodiments, the ego-machine 102 may include one or more systems, sub-systems, machine learning models, neural networks, deep neural networks, etc. that may be configured to determine one or more perception, planning, control, safety, and/or other operations based on data that may be received and/or otherwise obtained. For example, sensor data corresponding to one or more of the sensors 104 may be obtained or otherwise communicated to the ego-machine 102. The ego-machine 102 may be configured to determine one or more operations to perform based at least on the sensor data generated using the one or more corresponding sensors 104. For example, the one or more operations may include altering one or more paths through the environment, decelerating, accelerating, turning, changing lanes, performing one or more evasive maneuvers, coming to a stop, handing control back to a human operator, etc. Aside from physical movement, the ego-machine 102 may perform one or more internal operations based on sensor data, such as, for example, increasing power to one or more internal heating elements in response to cold temperatures or, conversely, increasing power to one or more cooling elements (e.g., fans and the like) in response to warm temperatures, where the temperature may be determined using sensor data collected and/or generated using one or more sensors corresponding to the ego-machine 102.

In some embodiments, the ego-machine 102 may include the sensors 104 associated therewith or corresponding thereto. For example, the sensors 104 may be disposed on the ego-machine 102. In some embodiments, and as illustrated in FIG. 1, the ego machine 102 may include a first sensor 104*a*, a second sensor 104*b*, and a third sensor 104*c*, referred to collectively as "the sensors 104."

The sensors 104 may respectively correspond to a particular sensor modality. A sensor modality may include a particular category of sensors that may be used to detect and measure one or more characteristics of the environment 100. In some embodiments, different sensor modalities may refer to differences in sensor data corresponding to the sensors 104. For example, a first sensor modality may include sensors that may generate image data, a second sensor modality may include sensors that may generate RADAR data, a third sensor modality may include sensors that may generate LiDAR data, and so on.

In some embodiments two or more of the sensors 104 may correspond to a same sensor modality. For example, the first sensor 104*a*, the second sensor 104*b*, and the third sensor 104*c* may be image sensors (e.g., cameras). Additionally or alternatively, two or more of the sensors 104 may correspond to different sensor modalities. For example, the first sensor 104*a* may be an image sensor, the second sensor 104*b* may be a RADAR sensor, and the third sensor 104*c* may be a LiDAR sensor.

In some embodiments, the sensors 104 may be configured to generate and/or collect sensor data corresponding to the environment 100. For example, in the context of the sensors 104 as image sensors, the image sensors may be configured to generate image data corresponding to the environment. The image data, in the example, may be used by the ego-machine 102 to perceive one or more characteristics, objects, obstacles, and/or other portions of the environment 100 in which the ego-machine 102 may be located.

In some embodiments, the sensors 104 may be configured to generate sensor data corresponding to respective fields of view (or sensory fields) of the sensors 104 (e.g., as represented by the fields of view 106). For example, in some embodiments, the first sensor 104*a* may be configured to generate sensor data corresponding to a first field of view 106*a*, the second sensor 104*b* may be configured to generate sensor data corresponding to a second field of view 106*b*, and the third sensor 104*c* may be configured to generate sensor data corresponding to a third field of view 106*c*. As illustrated in FIG. 1, the collective area associated with the first field of view 106*a*, the second field of view 106*b*, and the third field of view 106*c* may be collectively referred to as the fields of view 106.

In some embodiments, respective fields of view 106 may define potential spatial coverage of sensor data corresponding to an individual sensor. In some embodiments, the potential spatial coverage may correspond to a particular plane. For example, a ground plane corresponding to the ground in the environment 100 where the ego-machine 102 may be located. Additionally or alternatively, the spatial coverage defined by respective fields of view 106 may include respective volumes corresponding to the environment 100 where sensor data corresponding to individual sensors 104 may be generated and/or collected.

In some embodiments, respective fields of view 106 may be defined based on individual sensors and/or individual sensor characteristics. In some embodiments, the spatial coverage may be identified using one or more inherent characteristics of the individual sensor; such as, for example, focal length, lens size, lens type, mirror diameter, aperture size, scan density, resolution, transmission power, antenna size, transmission to reception power ratio, etc. For example, a particular image sensor may generate image data representing a particular portion of an environment that corresponds to (e.g., is within) a particular field of view of the particular image sensor.

Additionally or alternatively, individual fields of view 106 may be based on one or more mechanical limitations associated with respective sensors 104 and/or the ego-machine 102. In some embodiments, for example, sensor placement with respect to the ego-machine 102 may affect the corresponding field of view 106 of the sensor 104. For example, in the context of the ego-machine 102 as a vehicle, an image sensor may be placed in the center of the rear bumper of the vehicle. As a result, the field of view of the image sensor may be limited to the area of the environment behind the vehicle. Other mechanical limitations that may affect respective fields of view 106 associated with corresponding sensors 104 may include range of motion, sensor housing, power and energy constraints, environmental conditions, etc. For example, in instances where power may need to be conserved, the ability of a sensor to tilt, move, pan, etc. may be artificially limited and, therefore, the corresponding field of view 106 may be correspondingly limited.

In some embodiments, the respective fields of view 106 may be based on the type of sensor 104. For example, in the context of the first sensor 104*a* as an image sensor, the image sensor may include a range of degrees in the horizontal and vertical directions as well as a reference distance in front of the image sensor that may be included in the field of view (e.g., 50-degrees in the horizontal direction and 50-degrees in the vertical direction with a 10 meter distance) that may be captured by the image data corresponding to the image sensor. As an additional example, in the context of the second sensor 104*b* as a RADAR sensor, the corresponding field of view may include a horizontal field of view of 30 degrees and a vertical field of view of 10 degrees with a distance of 200 meters that may be captured by RADAR sensor data corresponding to the RADAR sensor.

In some embodiments, respective fields of view 106 may be determined, defined, and/or otherwise calculated based on characteristics associated with the sensor 104 itself rather than on obstacles, blockages, etc. that may be present in the environment. For example, an image sensor may be configured to generate sensor data corresponding to a field of view that includes a horizontal field of view of 75-degrees at a distance of 10 meters and a vertical field of view of 50-degrees at a distance of 10 meters. Continuing the example, the visibility of the sensor may be constricted by blockages, obstacles, objects, etc., however, the field of view 106 may remain the same.

In some embodiments, the first field of view 106*a* may be the same as the second field of view 106*b* and/or the third field of view 106*c*. Additionally or alternatively, the first field of view 106*a* may be different from the second field of view 106*b* and/or the third field of view 106*c*. In some embodiments, as illustrated in FIG. 1, the fields of view 106 may overlap with one another. For example, the first field of view 106*a* may overlap fully or partially with the second field of view 106*b* and/or the second field of view 106*b* may overlap fully or partially with the third field of view 106*c*.

In some embodiments, the first field of view 106*a*, the second field of view 106*b*, and the third field of view 106*c* may, collectively, be included in an aggregate field of view that may be associated with the ego-machine 102. In some embodiments, the aggregate field of view may include a total area and/or volume that may be defined by the sensor data generated and/or collected using the sensors 104.

In some embodiments, the aggregate field of view (or aggregated sensory field) may be aggregated based on sensors in the same sensor modality. For example, in the context of the first sensor 104*a* and the second sensor 104*b* as image sensors and the third sensor 104*c* as a LiDAR sensor, the aggregate field of view may correspond to the image data and may therefore include the area and/or volume that may be defined by the first field of view 106*a* and the second field of view 106*b*. Additionally or alternatively, the aggregate field of view may include different types of sensors. For example, continuing in the context of the first sensors 104*a* and the second sensor 104*b* as image sensors and the third sensor 104*c* as a LiDAR sensor, the aggregate field of view may include the total area and/or volume defined by the first field of view 106*a*, the second field of view 106*b*, and the third field of view 106*c*.

In some embodiments, the sensors, within the fields of view 106, may generate and/or collect sensor data that may indicate a presence or absence of one or more objects—e.g., the object 108. In some embodiments, the object 108 may include one or more objects within the environment 100. For example, the object 108 may include one or more static and/or dynamic objects, road hazards, obstacles, items, signs, wait conditions, traffic signals, construction barricades, boundaries, etc. within the environment 100. For example, in the context of the ego-machine 102 as a vehicle, the object 108 may include one or more other vehicles. Additionally or alternatively, the object 108 may include and/or represent one or more barriers, dips, speed bumps, potholes or other cavities, pedestrians, lanes, etc. In some embodiments, the object 108 may be detected using sensor data corresponding to one or more sensors 104. In some embodiments, the object 108 may be detected using sensor data corresponding to one or more sensors 104 within the fields of view 106 of one or more individual sensors 104.

In some embodiments, the object 108 may be captured and/or identified using sensor data corresponding to the second sensor 104*b*. Additionally or alternatively, the object 108 may be captured and/or identified using sensor data corresponding to the first sensor 104*a*, the third sensor 104*c*, and/or the second sensor 104*b*. In some embodiments, the object 108 may be determined to be occupying a particular portion of the aggregate field of view defined by the first field of view 106*a*, the second field of view 106*b*, and the third field of view 106*c*.

In some embodiments, the aggregate field of view may be divided into one or more portions, where the one or more portions include one or more sub-areas and/or volumes associated with the aggregate field of view. In some embodiments, the one or more portions may be covered by or otherwise detectible using sensor data corresponding to multiple sensors. Additionally or alternatively, the one or more portions may be covered by or otherwise detectible using sensor data corresponding to an individual sensor. In some embodiments, it may be determined that a portion of the one or more portions of the aggregate field of view may be blurred or blocked. In some embodiments, the ego-machine 102 may be configured to place less weight on the sensor data corresponding to portions of the aggregate field of view that may be blocked, blurred, or otherwise obscured. Determining whether one or more portions of the aggregate field of view may be blocked, blurred, etc. may be described and/or illustrated further in the present disclosure, such as, for example, with respect to FIGS. 2, 3A, 3B, 3C, and/or 4.

Modifications, additions, or omissions may be made to FIG. 1 without departing from the scope of the present disclosure. For example, the number of ego-machines 102, the number of sensors 104 and corresponding fields of view 106 may vary. The number, size, type, etc. of the object 108 may vary. The specifics given and discussed are to help provide explanation and understanding of concepts of the present disclosure and are not meant to be limiting.

Figure 2:
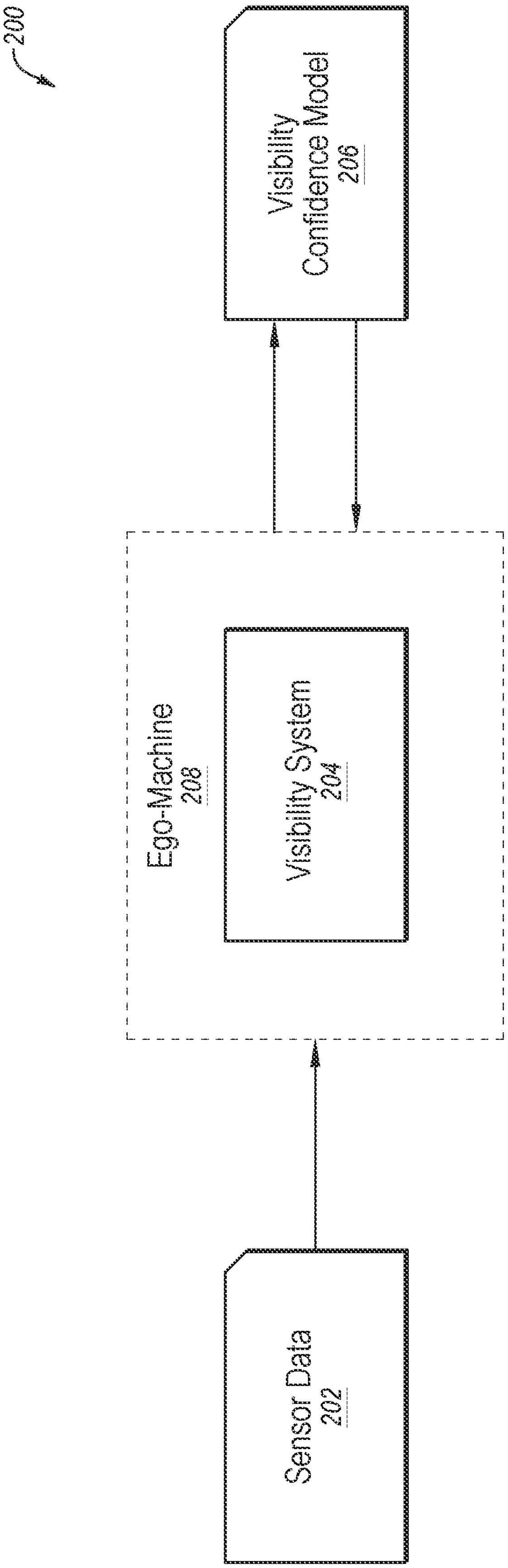
FIG. 2 illustrates an example environment for generating a visibility confidence model, in accordance with one or more embodiments of the present disclosure.

FIG. 2 illustrates an example environment 200 for generating a visibility confidence model 206, in accordance with one or more embodiments of the present disclosure. In some embodiments, the environment 200 may be the same as and/or included in the environment 100. For example, the visibility confidence model 206 may include a model indicating levels of confidence in the sensor data 104 corresponding to the fields of view 106.

In some embodiments, the environment 200 may include a visibility system 204 that may be configured to generate the visibility confidence model 206 using sensor data 202. In some embodiments, the visibility system 204 may be included in and/or associated with an ego-machine 208 that may be located in the environment 200, where the ego-machine 208 may be the same as and/or analogous to the ego-machine 102.

The sensor data 202 may include data that may be generated and/or collected using one or more sensors. In some embodiments, the one or more sensors may be associated with the ego-machine 208 that may correspond to the visibility system 204. In some embodiments, the sensor data may be generated and/or collected using sensors that may be used in one or more visibility systems such as, for example, one or more image sensors, RADAR sensors, LiDAR sensors, sound navigation and ranging (SONAR) sensors, infrared sensors, ultrasonic sensors, proximity sensors, and/or any other type of sensor that may generate and/or collect sensor data 202 that may be used in one or more visibility systems (e.g., the visibility system 204). In these or other embodiments, the sensor data 202 may be generated and/or collected using the sensors 104 that may be described and/or illustrated further in the present disclosure, such as, for example, with respect to FIG. 1.

In some embodiments, the sensor data 202 may correspond to one or more sensors that may generate and/or collect data corresponding to the environment in which the sensor may be located. For example, the sensor data 202 may be generated and/or collected using one or more temperature sensors, humidity sensors, barometric pressure sensors (e.g., barometers), rain gauges, UV sensors, radiation detectors, and/or other sensors that may generate data and/or information corresponding to the environment in which the sensors may be located.

In some embodiments, the sensor data 202 may include data and/or information that may be generated using one or more sensors that may be configured to measure one or more movement characteristics. For example, the sensor data 202 may include data and/or information generated using one or more speed sensors, accelerometers, gyroscopes, inertial measurement units (IMUs), Global Positioning System (GPS) sensors, strain gauges, tilt sensors (e.g., inclinometers), and/or other sensors that may be used to generate and/or collect data corresponding to one or more movement characteristics of one or more machines, systems, devices, etc.

In some embodiments, the sensor data 202 may correspond to the ego-machine 208. For example, the sensor data 202 may include data indicating the velocity and/or speed of the ego-machine 208, the position and/or orientation of the ego-machine 208, the acceleration of the ego-machine 208, etc. Further, the sensor data 202 may include information corresponding to the environment in which the ego-machine 208 may be located. For example, the sensor data 202 may indicate that the environment in which the ego-machine 208 may be located may be rainy with a certain amount of precipitation falling and the environment being a certain temperature. Additionally or alternatively, the sensor data

202 may be used in one or more visibility systems 204 associated with the ego-machine 208. For example, RADAR data may be generated using RADAR sensors located in or on the ego-machine 208 such that the sensor data 202 may correspond to a portion of the environment surrounding the ego-machine 208.

In some embodiments, the sensor data 202 may be associated with a particular field of view or sensory field. For example, sensor data 202 may correspond to a first sensor that may have a first field of view, sensor data 202 may correspond to a second sensor that may have a second field of view, and so on. In some embodiments, sensor data 202 may correspond to a particular data frame, where the data frame includes sensor data 202 corresponding to a particular field of view at a particular time stamp. In some embodiments, the fields of view to which the sensor data 202 may correspond may be the same as and/or analogous to the fields of view 106 described and/or illustrated further in the present disclosure, such as, for example, with respect to FIG. 1.

In some embodiments, the sensor data 202 may include metadata. In some embodiments, the metadata may indicate the structure of the sensor data 202, the sensor and/or channel to which the sensor data 202 may correspond, one or more timestamps for when the sensor data 202 may have been captured, data and/or information corresponding to one or more intrinsic characteristics of the sensor from which the sensor data 202 may have been generated (e.g., focal length, sensitivity, accuracy, resolution, calibration requirements, operating range, etc.). In some embodiments, the sensor data 202 may include a position and orientation of respective sensors with respect to the ego-machine 208. For example, a camera may generate sensor data 202. The camera may be located on the front of the ego-machine 208 and pointed forward relative to the ego-machine 208. Continuing the example, the camera may be generating image data with a field of view reaching forward one hundred (100) yards and fifteen (15) degrees on either side of the midline of the ego-machine 208. Further continuing the example, the sensor data 202 may include the relative information corresponding to the field of view such that individual fields of view of one or more of the sensors may be determined. For example, the sensor data 202 may include information that may be used to determine where individual fields of view corresponding to respective sensors may be located with respect to one or more other individual fields of view.

In some embodiments, the sensor data 202 may include data and/or information corresponding to one or more errors that may have been encountered by the sensors that may have generated and/or collected the sensor data 202. For example, one or more electrical errors, disconnections, short circuits, failures to generate data properly, errors in transmitting or otherwise communicating the sensor data 202, and/or one or more other errors associated with individual sensors.

In some embodiments, the sensor data 202 may be transmitted and/or otherwise communicated to the ego-machine 208 and/or the visibility system 204. In some embodiments, the ego-machine 208 may include one or more systems, robots, vehicles, drones, equipment, etc. that may be configured to perform one or more operations based on the sensor data 202. For example, the ego-machine 208 may include one or more drones, robots, industrial robots, boats, cars, trucks, other vehicles, ego-machines, etc. In some embodiments, the ego-machine 208 may be configured to travel from one location to another based on the sensor data 202. In some embodiments, travelling from one location to another may include travelling from one position on a ground plane to a second position on the ground plane. Additionally or alternatively, travelling from one location to another may include the ego-machine 208 traveling through a particular volume from a first position and elevation to a second position and elevation.

In some embodiments, the ego-machine 208 may be configured to use the sensor data 202 to traverse the environment and/or a portion of the environment (e.g., from a first position to a second position). For example, the ego-machine 208 may include one or more cameras that may collect and/or generate image data corresponding to the environment. Continuing the example, the ego-machine 208 may be configured to use the image data generated using the one or more corresponding sensors to navigate from a first portion of the environment to a second portion of the environment. While the example uses image data, the use of image data is not meant to be limiting; for example, the ego-machine 208 may include one or more other sensors, such as, for example, one or more RADAR sensors, LiDAR sensors, SONAR sensors, infrared sensors, and/or other sensors that may generate sensor data 202.

In some embodiments, the ego-machine 208 may be configured to communicate with one or more other machines, systems, subsystems, etc. to receive information corresponding to the environment. For example, one or more systems outside of the ego-machine 208 may be configured to transmit and/or otherwise communicate data the sensor data 202 to the ego-machine 208. For example, one or more other systems may be configured to generate weather data, temperature data, humidity data, etc. corresponding to the environment or a portion of the environment. In some embodiments, the ego-machine 208 may be configured to receive that information from one or more other sources, systems, devices, machines, servers, edge servers, cloud servers, data centers, etc. Continuing the example, the ego-machine 208 may be configured to adapt and/or change one or more control commands based on the data and/or information that may have been received from one or more other systems (e.g., alter one or more paths through the environment, decelerate, turn, change lanes, perform one or more evasive maneuvers, etc.).

In some embodiments, the ego-machine 208 may include one or more visibility or perception systems, e.g., the visibility system 204. In some embodiments, the visibility system 204 may include a collection of systems, subsystems, neural networks, machine learning models, and/or one or more combinations of the foregoing that may be configured to perform a series of processing operations. In some embodiments, the visibility system 204 may be configured to populate a visibility confidence model 206 with data corresponding to levels of visibility and/or confidence (referred to herein as "levels of confidence") associated with sensor data of a particular sensor and/or a particular sensor modality. In some embodiments, levels of confidence may be determined based on sensor data 202 corresponding to individual sensors of the sensor modality. In some embodiments, the visibility system 204 may be included in and/or communicate with one or more perception systems corresponding to the ego-machine 208.

In some embodiments, the visibility system 204 may be configured to populate and/or generate the visibility confidence model 206 corresponding to the environment surrounding the ego-machine 208. In some embodiments, the visibility confidence model 206 may include one or more data structures and/or visual representations of the one or more aggregate fields of view. For example, the visibility confidence model 206 may include a representation of a top-down view or BEV of the aggregate field of view as indicated using the sensor data 202. However, in some embodiments, the perspective may be different.

In some embodiments, the visibility confidence model 206 may correspond to one sensor modality. For example, a first visibility confidence model 206 may correspond to the total field of view associated with image sensors corresponding to the ego-machine 208. Continuing the example, a second visibility confidence model 206 may correspond to the total field of view associated with LiDAR sensors corresponding to the ego-machine 208. In some embodiments, the visibility confidence model 206 may include multiple layers, such as, for example, a first layer indicating respective levels of confidence corresponding to image data, a second layer indicating respective levels of confidence corresponding to RADAR data, and so on.

In some embodiments, the visibility confidence model 206 may include respective levels of confidence corresponding to sensor data aggregated across multiple sensor modalities. For example, the visibility confidence model may include levels of confidence corresponding to a total field of view associated with sensor data that may be generated using image sensors, RADAR sensors, SONAR sensors, LiDAR sensors, and so on.

In some embodiments, the visibility confidence model 206 may be generated for individual sensors of the sensor modality. Further, in some embodiments, the visibility confidence models 206 corresponding to individual sensors of the sensor modality may be aggregated to include respective levels of confidence and/or visibility aggregated across all of the sensors and/or all of the sensor data 202 corresponding to a particular sensor modality.

In some embodiments, the visibility confidence model 206 may be organized and/or generated as a queryable data structure. In some embodiments, the ego-machine 208 and/or one or more systems, subsystems, etc. that may correspond to the ego-machine 208 may be configured to generate one or more queries to determine whether and to what extent weight may be placed on sensor data corresponding to a particular location for control determinations. In some embodiments, the visibility confidence model 206 may provide a data structure that may quickly compare confidence and/or visibility data for a first location in an environment corresponding to a first sensor modality to confidence and/or visibility data for the first location in the environment corresponding to a second sensor modality.

In some embodiments, the data structure may be, for example, one or more radial distance maps (RDMs) corresponding to individual sensors, one RDM that includes data and/or information corresponding to all of the sensors in a same sensor modality, a grid-like data structure corresponding to, for example, the ground plane of an environment where each cell in the grid includes confidence, and/or visibility data that may be associated with that location on the ground plane. In some embodiments, the visibility confidence model 206 may include a data structure that may include a combination of the foregoing. In these or other embodiments, the visibility confidence model 206 and corresponding data structures may be described and/or illustrated further in the present disclosure, such as, for example, as described and/or illustrated with respect to FIGS. 3A, 3B, and/or 3C.

In some embodiments, the visual representation(s) and/or data structures may be subdivided into one or more sub-sections of the aggregate field of view. In some embodiments, the one or more sub-sections may represent respective portions of the aggregate field of view, that is, portions of the volume defined by the aggregate field of view. For example, the aggregate field of view may be represented by sensor data 202 corresponding to a volume associated with an ego-machine 208. Continuing the example, the aggregate field of view may be subdivided into one or more sub-sections, and, in some embodiments, the aggregate field of view may be represented by a visibility confidence model 206 indicating a respective confidence in sensor data 202 corresponding to respective sub-sections of the aggregate field of view.

In some embodiments, the visibility confidence model 206 may indicate a level of confidence in sensor data 202 corresponding to individual sub-sections of the aggregate field of view. In some embodiments, a low level of confidence for a particular sub-section of the aggregate field of view may indicate that the ego-machine 208 may not rely on the data corresponding to the particular sub-section. Additionally or alternatively, a low level of confidence associated with a particular sensor modality may indicate that the ego-machine 208 should rely on data corresponding to one or more other sensor modalities in an instance where the ego-machine 208 is receiving conflicting data with respect to the particular sub-section of the aggregate field of view. In some embodiments, the visibility confidence model 206 may include a data structure that may be queried by one or more other systems, subsystems, processing units, etc.

For example, the visibility system 204 may encounter conflicting data corresponding to a particular portion of the aggregate field of view associated with the ego-machine; such as, for example, RADAR data that may indicate a presence of an object and image data not indicating a presence of the same object. In response, the visibility subsystem 204 may query the visibility confidence model 206 to determine, for example, a weight to assign the image data versus the RADAR data corresponding to the particular environment. In response to the query, the visibility system 204 may determine that the image data may not be as reliable as the RADAR data corresponding to the portion of the aggregate field of view and may therefore rely on the RADAR data to perform one or more operations in response to the presence of the object.

In some embodiments, the visibility system 204 may be configured to determine one or more levels of confidence based on whether: (1) one or more faults and/or errors are associated with the individual sensor corresponding to the sensor data 202; (2) one or more gross-level blockages may affect the sensor data 202 corresponding to the individual sensor; (3) the sensor data 202 includes portion(s) of degraded sensor data; (4) one or more occlusions are present in the sensor data 202; (5) a visibility distance (e.g., a range or distance from the sensor that the sensor may be relied upon in normal operating conditions) of the sensor is compromised or reduced; and/or (6) one or more other evaluations.

In some embodiments, it may be determined whether one or more faults or errors are present and/or associated with the individual sensor. The one or more faults or errors may refer to one or more problems corresponding to sensor data 202 collection, transmission, and/or other errors that may indicate that the sensor data 202 corresponding to the individual sensor is not trustworthy or otherwise not useable. Additionally or alternatively, the one or more errors or faults may indicate that an individual sensor may not be healthy or otherwise functioning. For example, a sensor may no longer be electrically connected to the ego-machine 208, or the connection may be unstable. In some embodiments, the visibility system 204 may be configured to obtain data indicating that the sensor may not be electrically connected to the ego-machine 208.

In some embodiments, in response to determining that one or more errors exist associated with the individual sensor, the visibility system 204 may be configured to downgrade or decrease a level of visibility associated with the sensor data corresponding to the field of view of the individual sensor. For example, an aggregate field of view corresponding to an ego-machine associated with image sensors may correspond to a particular space, area, or volume around the ego-machine. Continuing the example, an individual image sensor may be configured to generate image data corresponding to a particular sub-section of the space or volume extending from the rear of the ego-machine. Further, it may be determined that the individual sensor is not functioning or, at least, not functioning properly. As a result, the visibility system 204 may decrease the level of confidence in the visibility of the image data corresponding to the particular sub-section of the space or volume extending from the rear of the ego-machine.

In some embodiments, determining that the sensor no longer functions properly may end operations that the visibility system 204 may perform using the individual sensor and/or sensor data 202 corresponding to the individual sensor. In contrast, in response to not finding, obtaining, or otherwise determining one or more faults and/or errors corresponding to the individual sensor, the visibility system 204 may continue to perform one or more operations to determine one or more confidence levels corresponding to the sensor data 202, such as, for example, determining whether one or more gross-level blockages may affect visibility corresponding to the individual sensor.

In some embodiments, the visibility system 204 may be configured to determine whether one or more gross-level blockages may be present using data other than the sensor data 202 corresponding to the individual sensor. Gross-level blockages may refer to conditions that may affect the sensor data 202 corresponding to the individual sensor. For example, environmental conditions, such as, for example, heavy rain, snow, hail, freezing temperatures, extreme heat, dust storms, etc. may be a gross-level blockage corresponding to the sensor data 202 associated with the individual sensor. Other examples of gross-level blockages may include time of day, time of year, etc. For example, the visibility system 204 may determine that a gross-level blockage may be assumed and/or applied to image data corresponding to an individual image sensor at night. In some embodiments, the determination that one or more gross-level blockages may be present in the sensor data 202 may be determined, for example, using one or more other sensors (e.g., temperature sensors, humidity sensors, etc.), data corresponding to one or more other systems (e.g., cameras, other machines, other systems, etc.), and other data corresponding to the ego-machine 208 and/or the environment in which the ego-machine 208 may be located.

In some embodiments, in response to determining that a gross-level blockage may correspond to sensor data 202 associated with the individual sensor, the visibility system 204 may be configured to downgrade or decrease a level of visibility and/or confidence associated with the sensor data 202 corresponding to the field of view of the individual sensor. In some embodiments, the amount that the level of confidence may be decreased may depend on the type of gross-level blockage and/or how degraded the sensor data is likely to be based on the gross-level blockage. For example, a light drizzle may result in a smaller decrease to the level of visibility corresponding to the sensor data 202 as compared to heavy rain.

In some embodiments, the visibility system 204 may be configured to perform one or more operations using the sensor data corresponding to the individual sensor to determine whether fine-level blockages and/or degradations are present in the sensor data. Fine-level blockages and/or degradations may include portions of sensor data 202 that may be blocked, blurred, or otherwise compromised. Gross-level blockages may apply to all or substantially all (e.g., 90%) of the sensor data 202 corresponding to the individual sensor. In comparison, finer-level blockages and/or degradations may include one or more portions of the sensor data 202 that may be blocked or unreliable. In some embodiments, one or more techniques may be used to determine whether portions of the sensor data may be degraded, blocked, blurred, or otherwise obscured. For example, in the context of sensor data 202 as image data, one or more frequency analyses, gradient analyses, object detection and segmentation analyses, and/or other analyses may be used to determine whether portions of the sensor data are degraded or blocked. As an additional example, in the context of LiDAR data, one or more point cloud analyses, range and intensity analyses, comparative analyses, etc. may be performed to determine whether and where one or more degradations may be present in the LiDAR data.

In some embodiments, in response to a determination that fine-level blockages and/or degradations are present in the sensor data 202 corresponding to the individual sensor, it may be determined whether and/or where the fine-level degradations affect sub-sections of the aggregate field of view corresponding to the visibility confidence model 206. In some embodiments, one or more other data structures and/or techniques may be used to determine whether fine-level blockages and/or degradations intersect with sub-sections of the aggregate field of view represented in the visibility confidence model 206. The techniques used to determine whether and to what extent one or more fine-level degradations may be included in the sensor data 202 may be described and/or illustrated further in the present disclosure, such as, for example, with respect to FIG. 3A. Further, one or more techniques used to determine blindness, blockages, blur, visibility distance, etc. corresponding to sensor data corresponding to individual sensors may be included in, as non-limiting examples, U.S. Pat. No. 11,508,049 filed Sep. 13, 2019, titled "DEEP NEURAL NETWORK PROCESSING FOR SENSOR BLINDNESS DETECTION IN AUTONOMOUS MACHINE APPLICATIONS", and/or U.S. Patent Publication No.: US 2023/0110027 filed Sep. 29, 2021, titled "VISIBILITY DISTANCE ESTIMATION USING DEEP LEARNING IN AUTONOMOUS MACHINE APPLICATIONS", the contents of which are incorporated in the present disclosure by reference in their entireties.

In addition to determining whether fine-level blockages and/or degradations are present in the sensor data corresponding to a particular sensor, the visibility system 204 may determine whether and/or where one or more occlusions may be indicated in the sensor data 202. For example, one or more static or dynamic obstacles that may be obscuring one or more other obstacles, objects, or areas such that the individual sensor may be unable to view and/or detect the one or more other obstacles or objects in the field of view. In some embodiments, to determine whether one or more occlusions may be indicated in the sensor data 202, map data corresponding to a map of the environment may be used. The map data may include data corresponding to static obstacles and/or objects that may be present in the field of view or outside the field of view of the individual sensor. Additionally or alternatively, historic sensor data may be used to determine whether one or more objects in sensor data corresponding to one or more previous time stamps may be casting shadows or otherwise obscuring sensor data 202 corresponding to one or more current time stamps. The techniques used to determine whether and to what extent one or more occlusions may be included in the sensor data 202 may be described and/or illustrated further in the present disclosure, such as, for example, with respect to FIG. 3A.

In some embodiments, confidence levels corresponding to the sensor data 202 associated with individual sensors of a corresponding sensor modality may be determined for one or more of the sensors corresponding to the sensor modality. Further, in some embodiments, confidence levels associated with respective sensor data 202 corresponding to respective sensors may be aggregated over the visibility confidence model 206. In some embodiments, one or more of the sub-sections of the aggregate fields of view corresponding to the total confidence model 206 may be populated with the aggregated confidence and/or visibility data and/or levels associated therewith.

In some embodiments, the ego-machine 208 may perform one or more operations based on the visibility confidence model 206. For example, the ego-machine 208 may be configured to generate one or more control commands that may direct the ego-machine 208 to perform the one or more operations. In some embodiments, the ego-machine 208 may plan one or more operations based on sensor data 202 and/or the data, values, and/or other information that may be included in one or more visibility confidence models 206. The one or more operations may include decelerating, accelerating, turning, changing lanes, performing one or more evasive maneuvers, etc.

In some embodiments, the ego-machine 208 may be configured to generate one or more queries to obtain information from the visibility confidence model 206. The one or more queries may include location information, sensor information, sensor modality information, and/or other information that may identify one or more subsections of the visibility confidence model 206. The ego-machine 208, for example, may generate a query seeking confidence and/or visibility information corresponding to image data associated with a particular location. The generated query may allow the ego-machine 208 to locate and/or receive confidence data and/or information corresponding to a particular location, a particular sensor, particular sensor data, etc. In some embodiments, with the confidence information, the ego-machine 208 may be configured to make one or more control determinations and/or perform one or more operations.

In some embodiments, the ego-machine 208 may perform one or more operations based on confidence values associated with and/or assigned to sensor data 202 corresponding to one or more subsections of the aggregate field of view of the visibility confidence model 206. In some embodiments, for example, the ego-machine 208 may be configured to determine a weight that may be given and/or assigned to the sensor data 202 (or portions or subsets thereof) corresponding to particular subsections of the visibility confidence model 206 based on the confidence values and/or data associated therewith. The given weights may be used to calculate and/or determine a degree of reliance that the ego-machine 208 may place on the sensor data 202 in generating control commands and/or determining one or more operations to perform.

In some embodiments, one or more operations may be performed based on one visibility confidence model 206 that may be associated with one sensor modality. For example the ego-machine 208 may include image sensors that may generate image data. Continuing the example, one or more subsections of the visibility confidence model 206 may indicate that image data corresponding to a particular subsection may have a lower level of confidence corresponding thereto compared with one or more other subsections of the visibility confidence model 206. Continuing the example, the ego-machine 208 may be configured to discount reliance on the image data—e.g., assign a lower weight to the image data corresponding to the particular subsection of the visibility confidence model 206. Further continuing the example, the ego-machine 208 may therefore rely more heavily on map data corresponding to a map of the environment, plan data that may have been generated, historical sensor data that may have been generated and reliable in one or more prior timestamps. In instances where the ego-machine 208 may not have any other source of reliable information, the ego-machine may perform one or more evasive maneuvers and/or perform operations to safely stop the ego-machine 208.

In some embodiments, one or more operations may be performed based on multiple visibility confidence models 206 associated with multiple respective sensor modalities. In some embodiments, the ego-machine 208 may be configured to assign weights to respective subsets of sensor data 202 corresponding to respective visibility confidence models 206 and rely on sensor data 202 that correspond to elevated confidence levels and/or data indicating elevated confidence levels.

For example, in the context of the ego-machine including image sensors and RADAR sensors generating image data and RDAR data respectively, two visibility confidence models 206 may be generated, a first visibility confidence model 206 corresponding to the image data and second visibility confidence model 206 corresponding to the RADAR data. Continuing the example, the first visibility confidence model 206 may indicate that confidence levels corresponding to the image data associated with a particular subsection of the visibility confidence model 206 may be lower than a predetermined threshold (e.g., due to rain, fog, image sensor errors, occlusions, etc.). Further continuing the example, the second visibility confidence model 206 may indicate that RADAR data corresponding to the same subsection may have an elevated or increased level of confidence compared with the image data. The ego-machine 208 may, in instances where discrepancies exist between the image data and the RADAR data, rely on the RADAR data rather than the image data to perform one or more operations. For example, if an object is detected in the RADAR data, but not detected in the image data, the ego-machine 208 may be configured to rely on the RADAR data to decelerate, turn, or perform one or more evasive maneuvers to avoid the object.

Modifications, additions, or omissions may be made to FIG. 2 without departing from the scope of the present disclosure. For example, the number of ego-machines 208, the number of sensors that may generate and/or collect the sensor data 202 may vary, the number of visibility confidence models 206 may vary. Further, the visibility system 204 may include multiple machine learning models, neural networks, perception systems, subsystems, etc. Additionally or alternatively, the visibility system 204 may be included in one or more other systems and/or machines other than the ego-machine 208. The specifics given and discussed are to help provide explanation and understanding of concepts of the present disclosure and are not meant to be limiting.

Figure 3A:
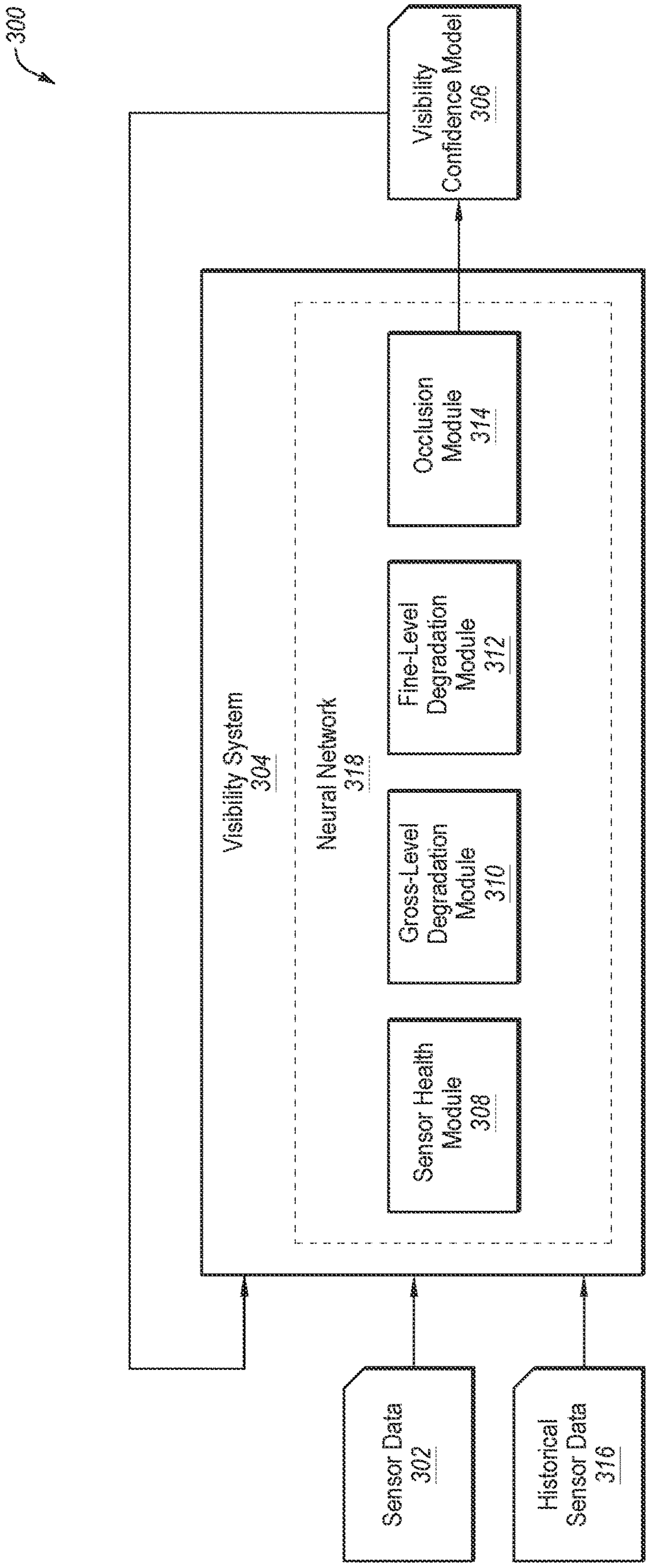
FIG. 3A illustrates an example environment illustrating a visibility system generating one or more visibility confidence models, in accordance with one or more embodiments of the present disclosure.

FIG. 3A illustrates an example environment 300 illustrating a visibility system 304 generating one or more visibility confidence models 306, in accordance with one or more embodiments of the present disclosure. In some embodiments, the environment 300 may be an example of and/or analogous to the environment 200 that may be described and/or illustrated further in the present disclosure, such as, for example, with respect to FIG. 2. In some embodiments, the visibility system 304 may be the same as and/or analogous to the visibility system 304 that may be described and/or illustrated further in the present disclosure, such as, for example, with respect to FIG. 2. In some embodiments, the visibility system 304 may be configured to use sensor data 302 to generate the one or more visibility confidence models 306.

In these or other embodiments, the sensor data 302 may be the same as and/or analogous to the sensor data 202 that may be described and/or illustrated further in the present disclosure, such as, for example, with respect to FIG. 2. Additionally or alternatively, the sensor data 302 may be an example of sensor data that may have been generated using one or more sensors that may be associated with one or more ego-machines (e.g., the sensors 104) that may be described and/or illustrated further in the present disclosure, such as, for example, with respect to FIG. 1.

In some embodiments, the visibility system 304 may include one or more systems, subsystems, machine learning models, neural networks, large language models (LLMs), DNNs, convolutional neural networks (CNNs), and/or other algorithms that may be configured to determine visibility of an environment using the sensor data 302. For example, the visibility system 304 may include a neural network 318 that may represent one or more machine learning models and/or neural networks that may be configured to process sensor data 302 and/or generate one or more visibility confidence models 306.

In some embodiments, the neural network 318 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, transformer, conformer, LLM, etc.), computer vision algorithms, and/or other types of machine learning models.

As an example, such as where the neural network 318 includes a CNN, the neural network 318 may include any number of layers. For example, one or more of the layers may include an input layer. The input layer may hold values associated with the sensor data 302. For example, when the sensor data 302 represents an image, the input layer may hold values representative of the raw pixel values of the image(s) as a volume (e.g., a width, a height, and color channels (e.g., RGB), such as $32\times32\times3$).

Additionally or alternatively, one or more layers included in the neural network 318 may include convolutional layers. The convolutional layers may compute the output of neurons that are connected to local regions in an input layer, each neuron computing a dot product between their weights and a small region they are connected to in the input volume. In some embodiments, a result of the convolutional layers may be another volume, with one of the dimensions based on the number of filters applied (e.g., the width, the height, and the number of filters, such as $32\times32\times12$, if 12 were the number of filters).

In some embodiments, one or more layers may include deconvolutional layers (or transposed convolutional layers). For example, a result of the deconvolutional layers may be another volume, with a higher dimensionality than the input dimensionality of data received at the deconvolutional layer.

In some embodiments, one or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

Additionally or alternatively, one or more of the layers may include a pooling layer. The pooling layer may perform a down sampling operation along the spatial dimensions (e.g., the height and the width), which may result in a smaller volume than the input of the pooling layer (e.g., $16\times16\times12$ from the $32\times32\times12$ input volume).

Additionally or alternatively, one or more of the layers may include one or more fully connected layer(s). Individual neurons in the fully connected layer(s) may be connected to each of the neurons in the previous volume. The fully connected layer may compute class scores, and the resulting volume may be $1\times1\times n$, where n is equivalent to the number of classes. In some examples, the CNN may include a fully connected layer(s) such that the output of one or more of the layers of the CNN may be provided as input to a fully connected layer(s) of the CNN. In some examples, one or more convolutional streams may be implemented by the neural network 318, and some or all of the convolutional streams may include a respective fully connected layer(s).

In some embodiments, the neural network 318 and/or corresponding neural network(s) may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the neural network 318, this is not intended to be limiting. For example, additional or alternative layers may be used in the neural network 318 and/or corresponding neural network(s), such as normalization layers, SoftMax layers, and/or other layer types.

In addition, some of the layers may include parameters (e.g., weights and/or biases), such as the convolutional layers and the fully connected layers, while others may not, such as the ReLU layers and pooling layers. In some examples, the parameters may be learned by the neural network 318 during training. Further, some of the layers may include additional hyper-parameters (e.g., learning rate, stride, epochs, etc.), such as the convolutional layers, the fully connected layers, and the pooling layers, while other layers may not, such as the ReLU layers. In embodiments where the neural network 318 regress on visibility distances, the activation function of a last layer of the CNN may include a ReLU activation function.

In embodiments where the neural network 318 include a CNN, different orders and numbers of the layers of the CNN may be used depending on the embodiment. In other words, the order and number of layers of the CNN is not limited to any one architecture.

For example, in one or more embodiments, the CNN may include an encoder decoder architecture, and/or may include one or more output heads. For example, the CNN may include one or more layers corresponding to a feature detection trunk of the CNN, and the outputs of the feature detection trunk (e.g., feature maps) may be processed using one or more output heads. For example, a first output head (including one or more first layers)—may be used to compute the health of individual sensors, a second output head (including one or more second layers) may be used to compute and/or determine one or more gross-level degradations corresponding to the sensor data 302, a third output head (including one or more third layers) may be used to compute and/or determine one or more fine-level degradations, and/or a fourth output head (including one or more fourth layers) may be used to compute and/or determine a presence or absence of one or more occlusions corresponding to the sensor data 302. As such, where two or more heads are used, the two or more heads may process data from the trunk in parallel, and each head may be trained to accurately predict the corresponding output(s) of that output head. In other embodiments, however, a single trunk may be used, without separate heads. While an architecture is described above with respect to the neural network 318, the architecture is exemplary and there may be other architectures that may be used to perform one or more of the described operations corresponding to the neural network 318.

In some embodiments, the visibility system 304 and/or corresponding neural network 318 may include one or more heads that may perform one or more operations corresponding to the description of a sensor health module 308, a gross-level degradation module 310, a fine-level degradation module 312, and/or an occlusion module 314. Additionally or alternatively, the aforementioned modules may be included in one or more separate machine learning models, neural networks, systems, subsystems, etc., where one or more outputs that may correspond to one or more of the sensor health module 308, the gross-level degradation module 310, the fine-level degradation module 312, and/or the occlusion module 314 may be used, for example, by the visibility system 304 and/or the neural network 318, to generate one or more visibility confidence models 306.

In some embodiments, the sensor health module 308, the gross-level degradation module 310, the fine-level degradation module 312, and/or the occlusion module 314 (together "the modules") may represent one or more heads and/or portions of the neural network 318. Additionally or alternatively, the modules may operate independently and/or in conjunction with the neural network 318. For example, the modules may include code and routines configured to allow a computing system to perform one or more operations. Additionally or alternatively, one or more of the modules may be implemented using hardware including one or more processors, CPUs graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In these and other embodiments, one or more of the modules may be implemented using a combination of hardware and software. In the present disclosure, operations described as being performed by respective modules may include operations that one or more of the modules may direct a corresponding computing system to perform. In these or other embodiments, one or more of the modules may be implemented by one or more computing devices, such as that described in further detail with respect to FIGS. 5A-5D, 6, and/or 7.

In some embodiments, the visibility system 304 and/or the neural network 318 may begin with a data structure or visibility confidence model 306 where the data structure and/or visibility confidence model 306 includes data indicating that each portion of the visibility confidence model 306 may be visible. In some embodiments, each portion being visible may indicate that the sensor data 302 corresponding to the aggregate field of view associated with all of the sensors corresponding to the ego-machine may not be obstructed, blurred, blocked, or otherwise compromised. In some embodiments, each of the modules corresponding to the visibility system 304 and/or the neural network 318 may be configured to determine whether individual portions of the visibility confidence model 306 may be defined using sensor data 302 that is unobstructed. In some embodiments, it may be determined (e.g., using one or more modules corresponding to the visibility system 304) that one or more portions of the visibility confidence model 306 may include sensor data 302 that may be blurred, blocked, or otherwise obstructed. In embodiments where the sensor data 302 may be blurred, blocked, or otherwise obstructed, the visibility system 304, the neural network 318, and/or the modules corresponding thereto may determine, calculate, and/or assign one or more levels of visibility to portions of the visibility confidence model 306.

For example, the visibility confidence model 306 may include multiple subsections, that may be associated with the aggregate field of view corresponding to multiple image sensors corresponding to an ego-machine. In some embodiments, the visibility confidence model 306 may begin, for example, with a value assigned to each of the subsections indicating that the subsections are visible. Further continuing the example, the visibility system 304, the neural network 318, and/or the corresponding modules may determine whether sensor data 302 corresponding to the subsections is obstructed, blocked, blurred, etc. In some embodiments, upon determining that sensor data 302 corresponding to one or more sub-sections of the visibility confidence model 306 may be blurred or obstructed, the perceptions system 304, the neural network 318, and/or one or more of the corresponding modules may be configured to add the data and/or information indicating confidence and/or visibility of individual subsections to the visibility confidence model 306. In some embodiments, the visibility confidence model 306 may be a queryable data structure such that the ego-machine may be configured to make one or more control determinations based on the visibility confidence model 306.

In some embodiments, the sensor health module 308 may be configured to determine whether individual sensors from which the sensor data 302 may be received, may be healthy and/or functioning properly. In some embodiments, reference to poor sensor health may indicate, for example, that one or more errors may be associated with a particular sensor, that individual sensors may not be electrically connected to transmit sensor data, that individual sensors may be collecting data including one or more errors, and/or otherwise indicating that individual sensors may not be functioning properly.

In some embodiments, the sensor health module 308 may determine that a sensor is not functioning properly based on a lack of data received from an expected source. For example, the sensor health module 308 may have received data from a first sensor in one or more prior time stamps. Continuing the example, for the current time stamp, the sensor data 302 may not include data from the first sensor. The sensor health module 308 may be configured to determine that the first sensor is therefore not functioning properly, may not be healthy, or may have encountered one or more errors.

In some embodiments, the sensor health module 308 may be configured to determine sensor health based on one or more irregularities in the sensor data 302. For example, the sensor data 302 may include one or more error codes that may indicate that one or more errors may have been encountered while generating data using particular sensors. As an additional example, the sensor health module 308 may be configured to determine that sensor data 302 corresponding to a first sensor may be different from sensor data 302 that may have previously been received from the first sensor. In response to the sensor data 302 from the first sensor being different from previous data received from the first sensor, the sensor health module 308 may be configured to determine that the first sensor may include one or more errors and/or may not be functioning properly. In some embodiments, based on the errors encountered and communicated using the particular sensors, the sensor health module 308 may be configured to determine whether the particular sensors are functioning properly.

In some embodiments, the sensor health module 308 may be configured to determine whether individual sensors may be healthy and/or functioning properly. In some embodiments, the sensor health module 308 may be configured to cycle through sensor data 302 corresponding to each sensor associated with a particular sensor modality to determine whether each of the individual sensors are healthy and/or functioning properly. For example, an ego-machine may include ten (10) image sensors that may be used to generate image data corresponding to the environment surrounding the ego-machine. Continuing the example, the sensor health module 308 may be configured to determine, using sensor data 302 corresponding to each of the ten (10) individual image sensors, whether each of the ten (10) image sensors may be functioning properly.

In some embodiments, in response to the sensor health model 308 determining that an individual sensor may not be functioning properly, the sensor data 302 corresponding to a field of view associated with the particular sensor may be downgraded and/or determined as not visible to the ego-machine. In some embodiments, a portion and/or portions of the visibility confidence model 306 may be downgraded to a visibility of zero (0) or its equivalent in the visibility confidence model 306.

In some embodiments, the data structure corresponding to the visibility confidence model 306 may include data and/or information indicating that the portion of the aggregate field of view associated with the individual sensor that may not be functioning properly may not be visible. Additionally or alternatively, the data and/or information may indicate that the portion of the aggregate field of view may include a depressed confidence value, where the confidence value may indicate an amount of weight or confidence that may be place in the sensor data 302 corresponding to the portion of the aggregate field of view. In some embodiments, decreasing the confidence values and/or data may correspondingly change one or more visual representations of the visibility confidence model 306. For example, the visibility confidence model 306 may illustrate a top-down environment of the aggregate field of view. In some embodiments, the portion of the aggregate field of view that may correspond to corrupted sensor data may indicate a poor or depressed confidence level with a difference in coloration or some other visual indicator that a portion of the aggregate field of view may not be visible.

For example, image data corresponding to a particular image sensor may correspond to a portion (e.g., one or more subsections) of the visibility confidence model 306. Continuing the example, the image data may include data and/or information that may indicate that the image sensor may have encountered one or more errors such that the image data corresponding to the image sensor may be compromised, corrupted, or otherwise untrustworthy. Further continuing the example, as a result, the sensor health module 308 may be configured to downgrade or decrease a confidence value or confidence data corresponding to the portion of the visibility confidence model 306. Continuing the example, the sensor health module 308 may be configured to change data and/or information that may be included in the visibility confidence model 306 to reflect the downgrade or decrease in confidence in the sensor data 302. In some embodiments, in response to the sensor health module 308 determining that a particular sensor may not be functioning properly, the sensor data 302 corresponding to the particular sensor may not be transmitted and/or communicated further to, for example, the gross-level degradation module 310.

In some embodiments, in response to the sensor health module 308 determining that an individual sensor may be functioning properly, the sensor health module 308 may not change or determine one or more changes to the visibility and/or confidence values corresponding to the visibility confidence model 306 associated with the individual sensor. For example, the visibility confidence model 306 may begin with values, data, and/or information corresponding to one or more subsections of the aggregate field of view, where the values, data and/or information may indicate that sensor data 302 corresponding to each of the subsections is trustworthy and/or that the environment corresponding to the aggregate field of view is visible. Continuing the example, in response to the sensor health module 308 determining that an individual sensor and/or sensor data corresponding thereto may not include one or more errors, the sensor health module 308 may not change any data and/or information corresponding to the visibility confidence model 306. In this example, the visibility confidence model 306 may have begun with the assumption that the field of view is visible and, therefore, the sensor health module 308 may not change the data corresponding to the visibility confidence model 306. In some embodiments, the sensor health module 308 may be configured to transmit and/or otherwise communicate the sensor data 302 corresponding to a respective field of view may to one or more other modules such as, for example, the gross-level degradation module 310.

The gross-level degradation module 310 may be configured to determine whether one or more gross-degradations are included in the sensor data 302 corresponding to particular sensors and corresponding fields of view. In some embodiments, one or more gross degradations may include blockages, blurs, and/or other degrading factors that may affect all of the sensor data 302 corresponding to a particular sensor and/or multiple sensors. For example, weather may be a factor that may affect all, or substantially all, of the sensor data corresponding to a particular sensor. For example, freezing temperatures may impact and/or degrade sensor quality and, correspondingly, sensor data 302 corresponding to individual sensors. As an additional example, heavy rain may affect all of the sensor data 302 corresponding to, for example, an exposed image sensor.

In some embodiments, the gross-level degradation module 310 may be configured to determine one or more gross degradations based on data that may be generated and/or collected using one or more other sensors and/or from one or more other systems other than the sensors corresponding to, for example, the ego-machine. For example, one or more other sensors and/or systems may be configured to transmit weather, temperature, and other data that maybe associated with the environment in which the ego-machine may be located. For example, one or more edge servers and/or data centers may be configured to send or transmit weather data to the ego-machine. Continuing the example, the gross-level degradation module 310 may be configured to use the transmitted weather data to determine whether the total visibility model 306 may be updated to reflect one or more gross-degradations that may affect sensor data 302 corresponding to a particular sensor.

Additionally or alternatively, the gross-degradation module 310 may be configured to determine whether one or more gross degradations may affect the sensor data 302 corresponding to individual sensors based on the sensor data 302 itself. In some embodiments, the gross-degradation module 310 may be configured to determine that one or more gross-degradations may be present in the sensor data 302 based on historical sensor data 316 corresponding to a particular sensor. For example, sensor data 302 corresponding to a particular sensor may be considered "sharp" or at least acceptable for visibility. Continuing the example, in response to a determination that the sensor data 302 has deviated from the acceptable norm established using past data corresponding to the same sensor, the gross-level degradation module 310 may detect that the sensor data 302 may be blurred, blocked, obstructed, or otherwise compromised.

In some embodiments, the gross-degradation module 310, in response to detecting and/or determining that one or more gross-degradations exist in sensor data 302 corresponding to a particular sensor, the gross-degradation module 310 may be configured to downgrade or decrease a visibility confidence score corresponding to subsections associated with the entire field of view of the particular sensor. For example, in the context of a visibility confidence score of "1" being visible and "0" being completely obstructed, in response to a determination of heavy rain corresponding to an environment, a visibility confidence score associated with image data corresponding to a particular image sensor may be decreased from a 1 to a 0.5.

In some embodiments, the amount of a decrease and/or a downgrade in the visibility confidence score corresponding to sensor data associated with a particular sensor may depend on the sensor type and/or severity of the gross-level degradation. For example, in the context of heavy rain corresponding to an environment, a first visibility confidence score and/or value corresponding to image data generated using an image sensor may be less than a second visibility confidence score and/or value corresponding to RADAR data generated using a RADAR sensor in response to RADAR data not being as negatively affected, blurred, distorted, etc. as image data, for example, in adverse weather conditions. As an additional example, a first visibility score corresponding to image data may be less and/or indicate a lower confidence in visibility corresponding to an environment with heavy rain than a second visibility score corresponding to image data in an environment with light rain or comparatively light rain. Additional examples of environmental conditions that may be included in gross-level degradations may include excess sunlight, darkness (e.g., nightfall), other reasons for darkness (tunnels, overpasses, etc.), excess sound or vibration affecting one or more sensors, etc.

In some embodiments, it may be determined that any obstruction, blockage, blur, etc. above a certain threshold of sensor data 302 corresponding to a particular sensor may be determined to be a gross-level degradation. For example, a blockage or blur that may correspond to fifty-one percent (51%) of the sensor data 302 generated by a particular sensor may be a gross-level blockage. In some embodiments, the percentage may be 10%, 20%, 30%, 75%, 80%, 90%, 100% and any other percentage that may be determined to affect enough of the sensor data 302 corresponding to a particular sensor and/or field of view to be considered a gross-level degradation. In some embodiments, in response to determining that a gross-level degradation may exist and/or determine one or more visibility confidence scores depending therefrom, the gross-degradation module 310 may be configured to transmit and/or communicate the information corresponding to the visibility confidence model 306 to one or more other modules, systems, subsystems, etc. such as, for example, the fine-level degradation module 312.

In some embodiments, the fine-level degradation module 312 may be configured to determine one or more degradations and/or portions of the sensor data 302 that may be partially blocked, blurred, degraded, obscured, etc. In some embodiments, the one or more fine-level degradations may not apply to all of the sensor data 302 corresponding to a particular sensor. Rather, the fine-level degradations apply to a portion of the sensor data 302 corresponding to a particular sensor. In some embodiments, the fine-level degradation module 312 may be configured to determine one or more smaller portions of the sensor data 302 corresponding to a particular sensor that may be blocked, blurred, or otherwise obstructed as compared with the gross-level degradation module. In some embodiments, one or more smaller portions may be predetermined as compared with the gross-level degradations. For example, the smaller portions may include anything not affecting all or substantially all (e.g., 95% or more) of the sensor data 302 corresponding to a particular sensor. Additionally or alternatively, the smaller portions may include anything under 50% of the sensor data 302 corresponding to a particular sensor. In some embodiments, the amount of sensor data 302 that may be included in the one or more smaller degraded portions of sensor data 302 may include any amount of data less than the gross-level degradation (e.g., 1%, 5%, 10%, 25%, 50%, etc. of the total sensor data 302 corresponding to a particular sensor).

In some embodiments, one or more techniques may be used to determine whether portions of the sensor data may be degraded, blocked, blurred, or otherwise obscured. For example, in the context of sensor data as image data, one or more gradient analyses may be used to determine whether one or more portions of the image data may be degraded, blurred, blocked, etc. For example, one or more gradients and/or changes in pixel intensities in an x-direction and/or y-direction of the image. The x-direction and y-direction referring to distribution of pixels horizontally and vertically in an image. In some instances, the gradients and/or changes in pixel intensities may be determined using one or more gradient operators (e.g., a Sobel, Sharr, and/or Pewitt operator). Further continuing the example, one or more gradient magnitudes corresponding to individual pixels and/or collections of pixels may be determined (e.g., for the x-direction and the y-direction). In some instances, a threshold may be determined where gradient magnitudes falling beneath the threshold may be considered blurry regions of the image whereas gradient magnitudes above the threshold may be comparatively sharp portions of the image. In some instances, the threshold may be determined based on one or more heuristic analyses and/or loss functions corresponding, for example, to a neural network (e.g., the neural network 318).

Additionally or alternatively, one or more other analyses may be used to determine whether one or more portions of an image, for example, includes image data that may be blurry, obstructed, blocked, etc. For example, the fine-level degradation module 312 may use one or more frequency analyses, Laplacian edge detection algorithms, contrast analysis, image sharpness metrics, object detection and segmentation analyses, and/or other techniques, algorithms, analyses, and the like that may be used to determine whether portions of the sensor data are degraded, blocked, blurred, etc.

As an additional example, in the context of LiDAR data, one or more point cloud analyses may be used to determine whether and/or where one or more degradations may be included in the LiDAR data. For example, a LiDAR sensor may generate LiDAR data in the form of a point cloud that may correspond to the environment associated with the field of view of the LiDAR sensor. Different densities corresponding to one or more portions and/or regions of the point cloud may be determined and/or calculated. In some instances, large fluctuations, for example, one or more low density portions of the point cloud may indicate one or more blurred, blocked, or obscured regions of the sensor data (e.g., the sensor data 302).

Additionally or alternatively, one or more other analyses may be used to determine whether one or more portions of an LiDAR data that may be blurry, obstructed, blocked, etc. For example, range and intensity analyses, comparative analyses, and/or other techniques, algorithms, analyses, and the like that may be used to determine whether portions of the LiDAR data are degraded, blocked, blurred, etc. While examples have been given regarding image data and LiDAR data, the examples are not meant to be limiting. One or more other analyses or techniques may be used to determine whether one or more degradations may be present in the sensor data 302.

In some embodiments, in response to a determination that fine-level blockages and/or degradations may be present in the sensor data 302 corresponding to the individual sensor, it may be determined whether and/or where the fine-level degradations affect sub-sections of the aggregate field of view corresponding to the visibility confidence model 306. In some embodiments, the projections may be determined for sensor data 302 corresponding to individual sensors in order to determine where the sensor data 302 may be degraded in relation to the system as a whole. For example, in the context of an autonomous vehicle including multiple image sensors, it may be determined that one or more portions of image data corresponding to individual image sensors may be degraded. Continuing the example, degradations in sensor data 302 corresponding to individual image sensors may be projected onto a "rig-frame" or one or more other virtual environments in order to populate the visibility confidence model 306 with data and/or information associated with visibility confidence of sensor data 302 corresponding to individual sensors.

In some embodiments, to project one or more degradations from sensor data 302 corresponding to individual sensors to a system reference frame that may include sensor data 302 corresponding to the aggregate field of view, one or more radial distance maps (RDMs) may be generated to determine where one or more degradations in sensor data 302 may affect the visibility confidence model 306. In some embodiments, the fine-level degradation module 312 may be configured to project one or more rays from degraded sensor data 302 to a ground plane corresponding to the ground. For example, in the context of image data corresponding to an image, the fine-level degradation module 312 may determine that a portion of the image (e.g., a collection of pixels) may be degraded, blurred, blocked, etc. Continuing the example, the fine-level degradation module 312 may be configured to project a line or a ray from one or more of the pixels onto the ground plane of the environment that may be depicted using the image data.

In some embodiments, the fine-level degradation module 312 may additionally be configured to project one or more virtual objects into the same environment as the rays or lines that may be projected from the sensor data 302 (e.g., the image data from the example above). In some embodiments, by projecting one or more virtual objects in the environment, it may be determined whether the rays or lines corresponding to degraded sensor data 302 may affect perception of the virtual object and to what degree the degraded sensor data 302 may affect perception of the virtual object.

In some embodiments, the virtual object may be projected as if the virtual object is resting on the ground plane to determine where and/or whether the projected rays corresponding to the degraded sensor data 302 intersect with the one or more virtual objects; for example, using the projected ray and corresponding azimuth. For example, in the context of an autonomous vehicle generating image data corresponding to an image, one or more virtual, vehicle-sized objects may be projected onto a ground plane of an environment associated with the sensor data 302. Continuing the example, one or more rays may be projected from degraded pixels in the image to determine whether the projected rays may intersect with the one or more virtual, vehicle-sized objects. In response to the one or more rays intersecting with the one or more virtual, vehicle-sized objects, a confidence level associated with a portion of the visibility confidence model 306 corresponding to the virtual, vehicle-sized object may be downgraded or otherwise decreased.

In some embodiments, by generating one or more RDMs corresponding to sensor data 302 corresponding to one or more individual sensors, it may be possible to project sensor data 302 corresponding to individual sensors into a total system frame such that individual subsections of the visibility confidence model 306 may be populated with visibility confidence data associated with respective sensors corresponding to a system.

Figure 3B:
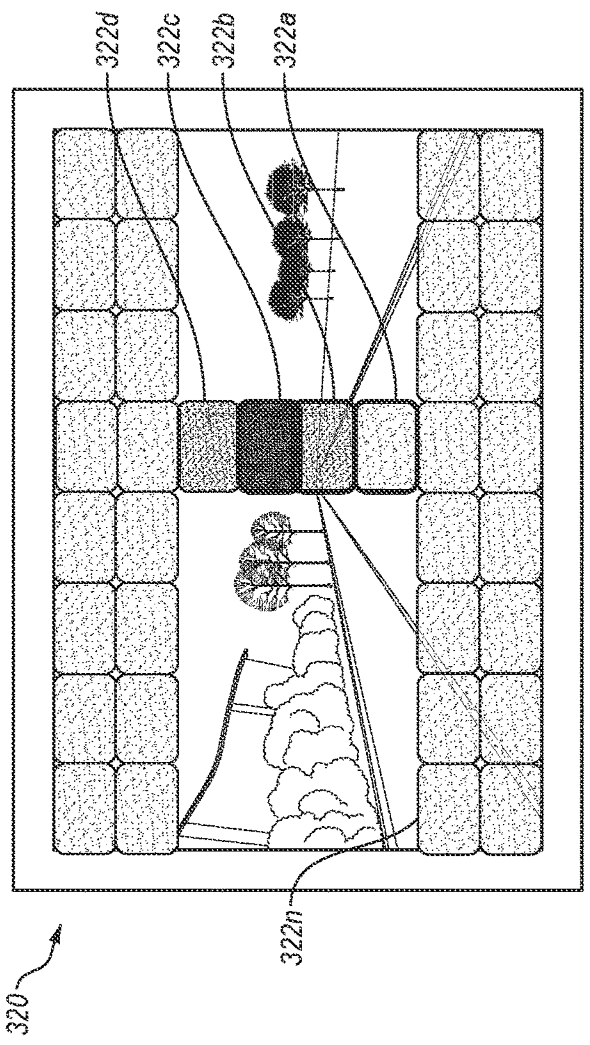
FIG. 3B illustrates an example environment depicted by an image subdivided into discrete subsections, in accordance with one or more embodiments of the present disclosure.
Figure 3C:
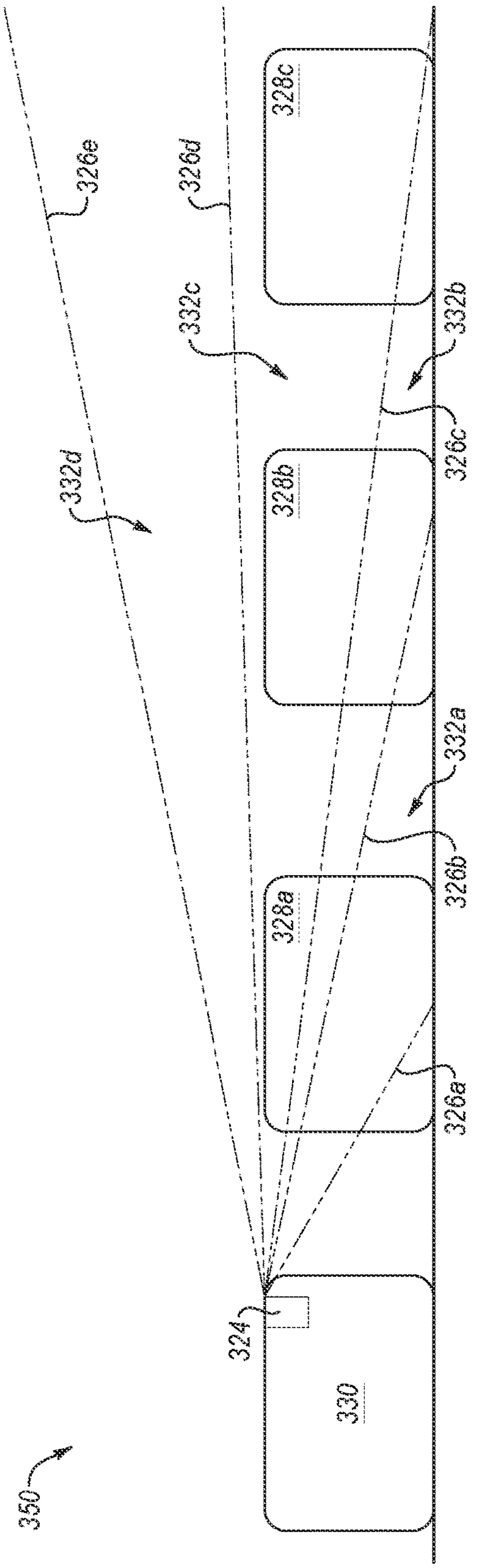
FIG. 3C illustrates a depiction of an environment with one or more projected rays corresponding to sensor data, in accordance with one or more embodiments of the present disclosure.

An example of projecting one or more rays from image data to a corresponding 3D environment to determine one or more levels of confidence may be illustrated with respect to FIGS. 3B and 3C. FIG. 3B illustrates an example environment depicted by an image 320 subdivided into discrete subsections 322, in accordance with one or more embodiments of the present disclosure. In some embodiments, the image 320 may be depicted using image data generated and/or collected using one or more image sensors associated with an ego-machine. In some embodiments, the image 320 may include portions of the corresponding ego-machine, for example, in a portion of the image nearest the bottom of the image 320 or, for reference, nearest a first subsection 322*a*. In some embodiments, the one or more subsections 322 may represent individual portions of the image 320 representing portions of the environment where the sensor data may be evaluated for confidence in visibility corresponding to the one or more subsections 322.

In some embodiments, the image 320 may include the first subsection 322*a* depicting a first portion of the environment, a second subsection 322*b* depicting a second portion of the environment, a third subsection 322*c* depicting a third portion of the environment, a fourth subsection 322*d* depicting a fourth portion of the environment, up to and including an nth subsection 322*n*. In some embodiments, the number of subsections 322 may depend on the size of the environment, the amount of sensor data included in the image 320, the amount of computing and/or processing power that may be available to the system(s) that may evaluate visibility associated with individual subsections 322, etc.

As illustrated in FIG. 3B, the nth subsection 322*n* may represent one or more subsections of the image 320 where the image data corresponding to the nth subsections may be visible. In FIG. 3B, for example, two rows at the top portion of the image 320 and two rows of subsections at the bottom portion of the image 320 may be represented by the nth subsection 322*n*. In some embodiments, the subsections represented by subsection 322*n* may also indicate one or more portions of the image 320 that may not be relevant for use with the visibility confidence model (e.g., the visibility confidence model 306 and/or the visibility confidence model 206). For example, in the context of an ego-vehicle, as illustrated in FIG. 3B, the bottom two rows may include image data corresponding to the hood of the vehicle and the two rows of subsections at the top of the image 320 may be pointed at the sky which may not be relevant for generating one or more visibility confidence models corresponding to an environment around the ego-vehicle. In response to one or more subsections mot being relevant, the ego-machine may save processing and computation power by assuming that the sensor data corresponding to the subsections are visible.

In some embodiments, relevant individual subsections 322 (e.g., 322*a*-322*d*) may be evaluated to determine whether one or more partial blockages and/or degradations may be present as described further in the present disclosure, such as, for example, with respect to FIG. 3A. In some embodiments, in response to determining that one or more partial degradations may exist in the sensor data corresponding to the subsections 322, one or more RDMs may be generated by projecting one or more rays from the image data corresponding to the image 320 onto the ground plane corresponding to the environment that may be depicted by the image 320.

An example depiction of generating an RDM by projecting rays corresponding to degraded sensor data 302 onto a ground plane may be depicted in FIG. 3C. FIG. 3C illustrates a depiction of an environment 350 where one or more rays 326 may be projected from sensor data corresponding to a sensor 324, in accordance with one or more embodiments of the present disclosure. In some embodiments, the environment 350 may include a system 330 to which the sensor 324 may correspond. For example, in the context of autonomous driving, the system 330 may include an ego-machine with multiple sensors corresponding thereto.

In some embodiments, the sensor 324 corresponding to the system 330 may be configured to generate sensor data. For example, in the context of the sensor 324 as an image sensor, the image sensor may be configured to generate image data corresponding to a particular environment. In some embodiments, the environment 350 may be a depiction of the environment captured in the image 320 described, for example, with respect to FIG. 3B.

In some embodiments, the environment 350 may include one or more rays 326, which may be projected using a corresponding azimuth to one or more portions of the ground plane corresponding to the environment 350. In some embodiments, individual rays may be projected from particular portions of the sensor data. For example, in the context of the sensor 324 generating image data corresponding to the image 320 in FIG. 3B, the rays 326 may be projected from particular portions of image data corresponding to the image 320. As illustrated in the environment 350, the rays 326 may correspond to projections of image data corresponding to respective edges of the subsections 322 of the image 320. For example, the first ray 326*a* may correspond to the edge of the subsection 322*a* that may be nearest the vehicle in the image 320. Further, a second ray 326*b* may correspond to a second edge of the first subsection 322*a* farthest from the vehicle and/or a first edge of the second subsection 322*b*, and so on.

In some embodiments, distances between rays 326 may correspond to distances between edges of subsections 322 of the image 320 as projected onto the ground plane of the environment 350. In some embodiments, the distances between rays 326 may reflect distances between edges of the subsections 322 as projected from the middle of the sensor 324 onto the ground plane of the environment 350. In some embodiments, the distances between rays 326 may be included in one or more regions of interest corresponding to the environment 350. For example, the area between the first ray 326*a* and the second ray 326*b* may be a first region of interest 332*a*, the area between the second ray 326*b* and the third ray 326*c* may be a second region of interest 332*b*, the distance between the third ray 326*c* and the fourth ray 326*d* may be a third region of interest 332*c*, and the area between the fourth ray 326*d* and the fifth ray 326*e* may be a fourth region of interest 332*d*, and so on.

In some embodiments, the environment 350 may include one or more projected objects 328 that may be placed on the ground plane at various distances from the front of the system 330. In some embodiments, the one or more projected objects 328 may include one or more objects used for reference in the environment 350. For example, in the context of the system 324 as an autonomous vehicle, the one or more projected objects 328 may include one or more vehicles. In some embodiments, the one or more vehicles may simulate vehicles travelling in relative proximity to the autonomous vehicle. In some embodiments, the size and shape of the projected objects 328 may vary. In some embodiments, the distances between the system 324 and the one or more projected objects 328 may vary. As illustrated in FIG. 3C, a first object 328*a*, a second object 328*b*, and a third object 328*c* may be included in the environment 350.

In some embodiments, it may be determined whether one or more rays 326 and/or corresponding regions of interest may intersect, overlap, or may otherwise be included in the same area as the one or more projected objects 328. In some embodiments, in response to one or more regions of interest intersecting or overlapping with one or more projected objects 328, the confidence value and/or data associated with the particular region may be determined and/or calculated for sensor data corresponding to that particular region of interest.

In some embodiments, the confidence value that may be determined may be aggregated across two or more regions of interest 332 that may overlap with the one or more projected objects. For example, the first object of interest 328*a* may be intersected by the first ray 326*a*, the second ray 326*b*, and/or the third ray 326*c*. In some embodiments, this may indicate that one or more portions of the first region of interest 332*a*, the second region of interest 332*b*, and the third region of interest 332*c* may affect the visibility of the first virtual object 328*a*. In some embodiments, the confidence and/or visibility data, value, information, etc. may be aggregated over the confidence and/or visibility data corresponding to the first region of interest 332*a*, the second region of interest 332*b*, and the third region of interest 332*c*.

Modifications, additions, or omissions may be made to FIGS. 3B and/or 3C without departing from the scope of the present disclosure. For example, the number of images 320 corresponding to a particular system, the number of sensors 324 from which the image 320 may be generated, the number of subsections 322 corresponding to the image, the number and/or type of system 330 may vary, the number of projected objects 328, the number of rays 326 may vary. The specifics given and discussed are to help provide explanation and understanding of concepts of the present disclosure and are not meant to be limiting.

Returning to FIG. 3A, in some embodiments, the fine-level degradation module 312 may be configured to generate one or more RDMs. For example, an array of RDMs may be generated, the array of RDMs including individual RDMs respectively corresponding to individual sensors. As illustrated, for example, in FIGS. 3B and 3C, an RDM may be generated based on one or more rays and corresponding azimuths that may be associated with degraded sensor data 302 corresponding to respective sensors. In some embodiments, visibility and/or confidence data may correspond to one or more regions of interest to determine whether and how well individual sensors may be configured to generate reliable and/or accurate sensor data 302.

Additionally or alternatively, the fine-level degradation module 312 may be configured to generate individual RDMs using sensor data 302 corresponding to respective individual sensors of the particular sensor modality. For example, a respective RDM may be generated using sensor data 302 corresponding to respective sensors corresponding to the sensor modality. In comparison to the example above, the respective RDMs may not be added to a single RDM corresponding to the machine; rather, each RDM may individually represent whether and/or where the fine-level degradations associated with the particular sensor may affect one or more sub-sections of the aggregate field of view corresponding to the visibility confidence model 306.

In some embodiments, the fine-level degradation module 312 may be configured to generate a combined RDM using all sensors corresponding to a particular sensor modality. For example, an RDM generated using a single sensor may be added to the combined RDM associated with a particular sensor modality. In some instances, each of the respective RDMs corresponding to the respective sensors may be added to the combined RDM associated with a particular sensor modality corresponding to a system, machine, ego-machine, etc.

In some embodiments, like the environment 350 illustrated in FIG. 3C, one or more objects (e.g., the one or more projected objects 328 described, for example, with respect to FIG. 3C) may be projected into the environment from the sensor data 302 to determine one or more regions of interest that may overlap with the projected objects. In some embodiments, the number of rays that may be projected may include only rays corresponding to blurry, blocked, or obstructed sensor data 302. In some embodiments, the RDMs may be stored separately and, therefore, when determining whether a location may correspond to one or more obstructed regions of interest, multiple data structures corresponding to respective RDMs may be queried.

Additionally or alternatively, the fine-level degradation module 312 may be configured to generate a "flat-Earth grid" or a cartesian coordinate grid corresponding to the ground plane in the environment where the system, machine, ego-machine, etc. may be located. In some embodiments, the grid may be populated by generating a grid representing discrete locations corresponding to the ground plane. In some embodiments, the grid cell size may be determined by projecting an object size (e.g., a vehicle-size object in the context of autonomous vehicles) onto the grid. Further, the fine-level degradation module 312 may be configured to determine one or more confidence and/or visibility levels corresponding to respective cells of the grid. Storing the confidence and/or visibility data in this manner may be computationally more expensive than generating, for example, RDMs corresponding to individual sensors. However, in comparison, storing data in a centralized grid may decrease complexity and computation to determine whether sensor data may be blocked or blurred at a particular location.

In some embodiments, the fine-level degradation module 312 may be configured to transmit, communicate, and/or send the data structure(s), sensor data 302, fine-level degradation data to the occlusion module 314. In some embodiments, the occlusion module 314 may be configured to determine whether one or more occlusions may be included in the sensor data 302. For example, one or more static or dynamic obstacles that may be obscuring one or more other obstacles, objects, or areas such that the individual sensor may be unable to view and/or detect the one or more other obstacles or objects in the field of view. In some embodiments, to determine whether one or more occlusions may be indicated in the sensor data 302, map data corresponding to a map of the environment may be used. The map data may include data corresponding to static obstacles and/or objects that may be present in the field of view or outside the field of view of the individual sensor.

For example, in the context of autonomous vehicles, the autonomous vehicle may include one or more image sensors that may generate image data corresponding to the environment. In some embodiments, the image data may not be able to see one or more static obstacles. For example, buildings, medians, gates, poles, storefronts, etc. In some embodiments, the autonomous vehicle may not see the static obstacles because a truck or other obstacle may be located between the vehicle and the static obstacle. Additionally or alternatively, one or more shadows may be located overtop of the static obstacle such that the autonomous vehicle may not be configured to see and/or locate the static obstacle. In some instances, the static obstacles may be around a corner or behind another building etc. Continuing the example above, the autonomous vehicle may be configured to perceive the static obstacle using HD map data corresponding to the environment that may inform the autonomous vehicle of static obstacles in the environment that may not be perceivable by the autonomous vehicle using the image data.

In some embodiments, historical sensor data 316 may be used to determine whether one or more objects in sensor data corresponding to one or more previous time stamps may be casting shadows or otherwise obscuring sensor data 302 corresponding to one or more current time stamps. In some embodiments, historical sensor data 316 may include sensor data such as, for example, the sensor data 302 that may have been collected and/or generated at one or more previous time stamps. For example, again in the context of an autonomous vehicle generating image data corresponding to an environment. A static obstacle may be visible at time t=0.

However, at t=2 the obstacle may no longer be visible due to a shift in traffic or a change in location to the autonomous vehicle, etc. Continuing the example, the autonomous vehicle may be configured to retain some historical memory of image data that may be included in the historical sensor data 316, where the historical memory of the image data may be used to determine a location corresponding to the static obstacle relative to the autonomous vehicle.

In some embodiments, determining a presence or absence of occlusions in sensor data 302 may be performed using one or more post-processing and/or rendering techniques corresponding to the sensor data. For example, one or more ray tracing techniques on a 2D raster, projecting 3D bounding boxes into the sensor data, etc. In some embodiments, the presence or absence of one or more occlusions may alter confidence and/or visibility determinations with respect to particular locations, areas, and/or volumes indicated using the sensor data 302.

In some embodiments, one or more models corresponding to individual sensors may be aggregated to form the visibility confidence model 306. In some embodiments, the visibility confidence model 306 may include multiple models and/or data structures corresponding to individual sensors. Additionally or alternatively, the visibility confidence model 306 may include an aggregation of the confidence and/or visibility determinations corresponding to sensor data 302 corresponding to each of the sensors of a sensor modality. Additionally or alternatively, the visibility confidence model 306 may include an aggregation of the confidence and/or visibility determinations corresponding to sensor data 302 associated with each of the sensors across multiple sensor modalities.

In some embodiments, the visibility confidence model 306 may include one or more different data structures that may include, for example, data and/or information generated using the sensor health module 308, the gross-level degradation module 310, the fine-level degradation module 312, and/or the occlusion module 314. In some embodiments, the visibility confidence model 306 may include, for example, the one or more generated RDMs and/or grid structures that may include confidence and/or visibility data corresponding to particular portions of the aggregate field of view. In these or other embodiments, the visibility confidence model 306 may be the same as and/or analogous to the visibility confidence model 206 described and/or illustrated further in the present disclosure, such as, for example, with respect to FIG. 2.

Modifications, additions, or omissions may be made to FIG. 3 without departing from the scope of the present disclosure. For example, the amount and/or type of sensor data 302 may vary, the type of visibility system 304, the number and/or type(s) of neural network 318 the number of modules configured to perform various operations, the number of visibility confidence models 306 may vary. The specifics given and discussed are to help provide explanation and understanding of concepts of the present disclosure and are not meant to be limiting.

Figure 4:
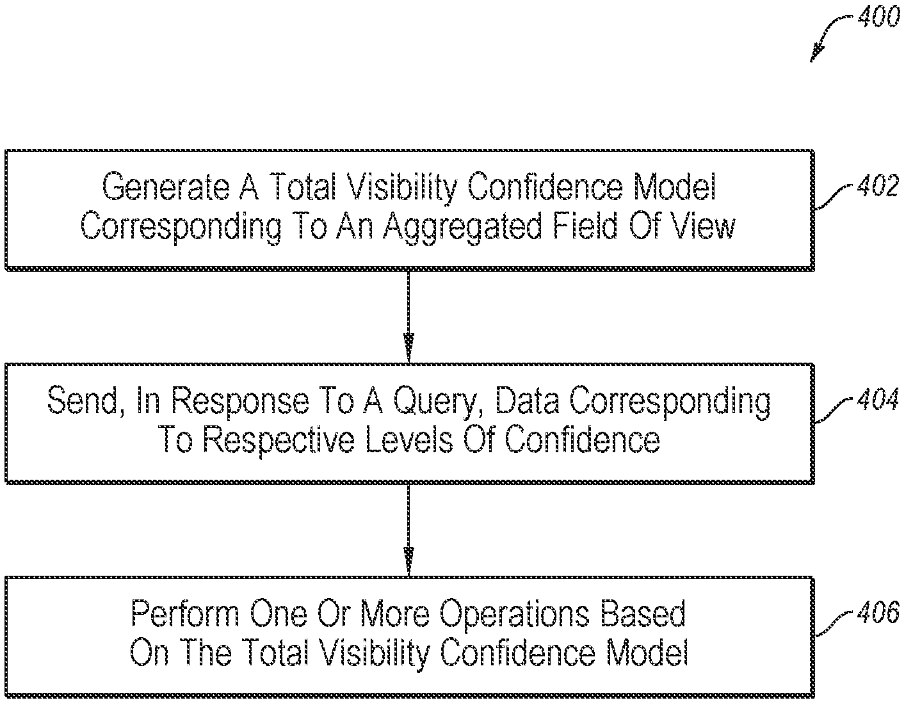
FIG. 4 is a flow diagram showing a method for generating one or more visibility confidence models and generating one or more control determinations based on the one or more visibility confidence models, in accordance with one or more embodiments of the present disclosure.

FIG. 4 is a flow diagram showing a method 400 for generating one or more visibility confidence models and generating one or more control determinations based on the one or more visibility confidence models, in accordance with one or more embodiments of the present disclosure. The method 400 may include one or more blocks 402, 404, and 406. Although illustrated with discrete blocks, the operations associated with one or more of the blocks of the method 400 may be divided into additional blocks, combined into fewer blocks, or eliminated, depending on the particular implementation.

In some embodiments, the method 400 may include block 402. At block 402, a visibility confidence model may be generated where the visibility confidence model may correspond to an aggregate field of view. In some embodiments, individual fields of view corresponding to the aggregate field of view may respectively define potential spatial coverage of sensor data that may correspond to multiple sensors associated with a machine. In some embodiments, the visibility confidence model may indicate a level of confidence in sensor data corresponding to individual sub-sections of the aggregate field of view.

In some embodiments, the respective levels of confidence may be determined based on one or more faults or errors that may be associated with an individual sensor of the multiple sensors. In these or other embodiments, the one or more faults or errors may be determined using one or more techniques and/or analyses that may be described and/or illustrated further in the present disclosure, such as, for example, with respect to the sensor health module 308 of FIG. 3A. Further, respective levels of confidence may be determined based on one or more gross level degradations and/or fine level degradations that may be described, for example, with respect to FIGS. 2 and/or 3A. Additionally or alternatively, the respective levels of confidence may be determined based on one or more fine-level degradations corresponding to the sensor data, such as, for example, fine-level degradations described with respect to FIGS. 2 and 3A. Additionally or alternatively, the respective levels of confidence may be determined based on one or more occlusions being present in the sensor data that may correspond to individual sub-sections of the aggregate field of view.

At block 404, the method may additionally include sending, in response to a query, data corresponding to respective levels of confidence. In some embodiments, the query may correspond to one or more systems that may navigate the environment corresponding to the sensor data and/or the visibility confidence model. In some embodiments, the query may include one or more particular portions of the environment and corresponding sensor modalities.

At block 406, the method may additionally include performing one or more operations based on the visibility confidence model. In some embodiments, the one or more operations may be performed based on one or more levels of confidence that may correspond to individual sub-areas of the aggregate field of view.

Modifications, additions, or omissions may be made to the method 400 and/or one or more operations included in the method 400 without departing from the scope of the present disclosure. For example, the operations corresponding to the method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 5A:
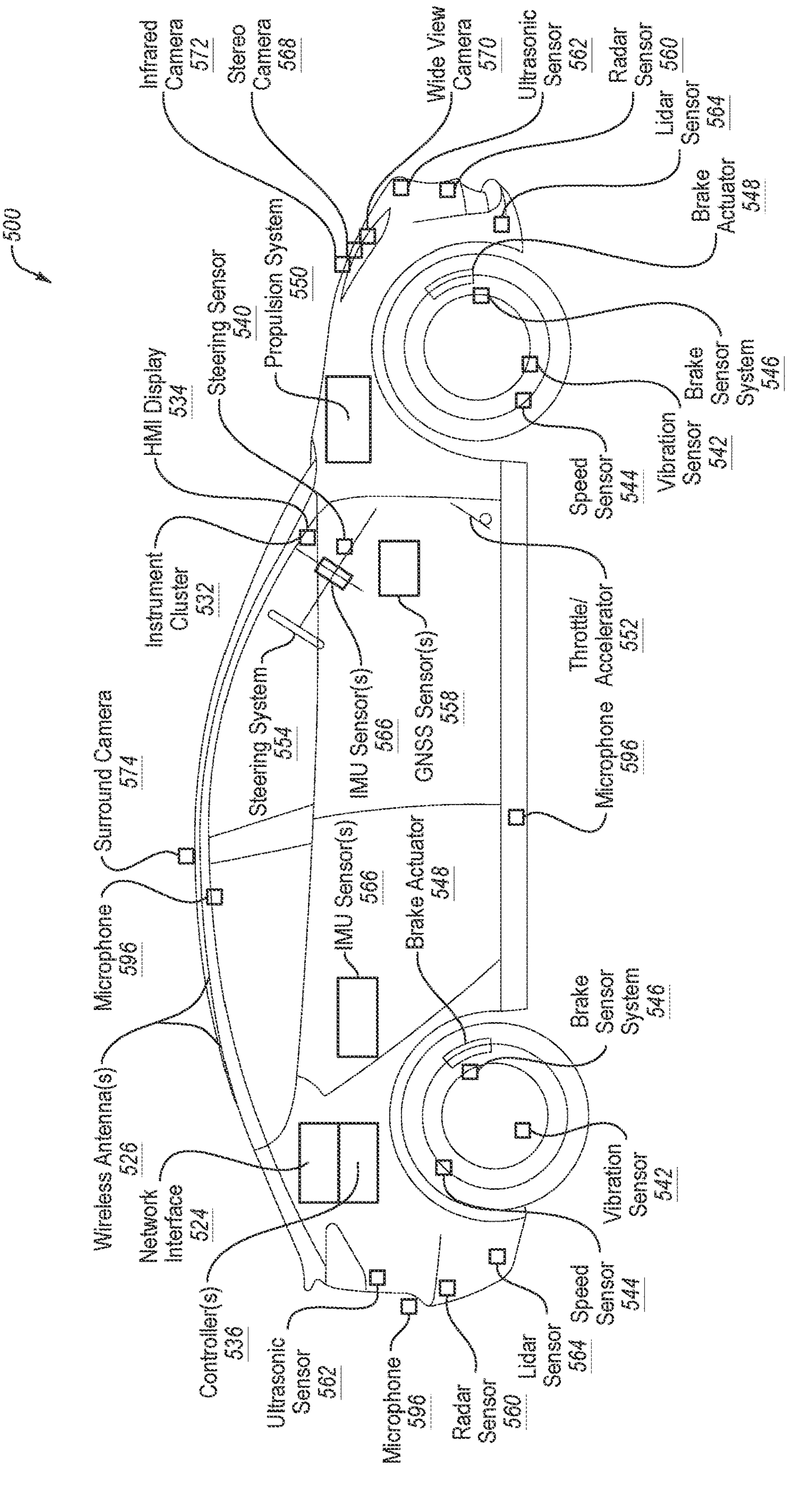
FIG. 5A is an illustration of an example autonomous vehicle, in accordance with one or more embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU (s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope (s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
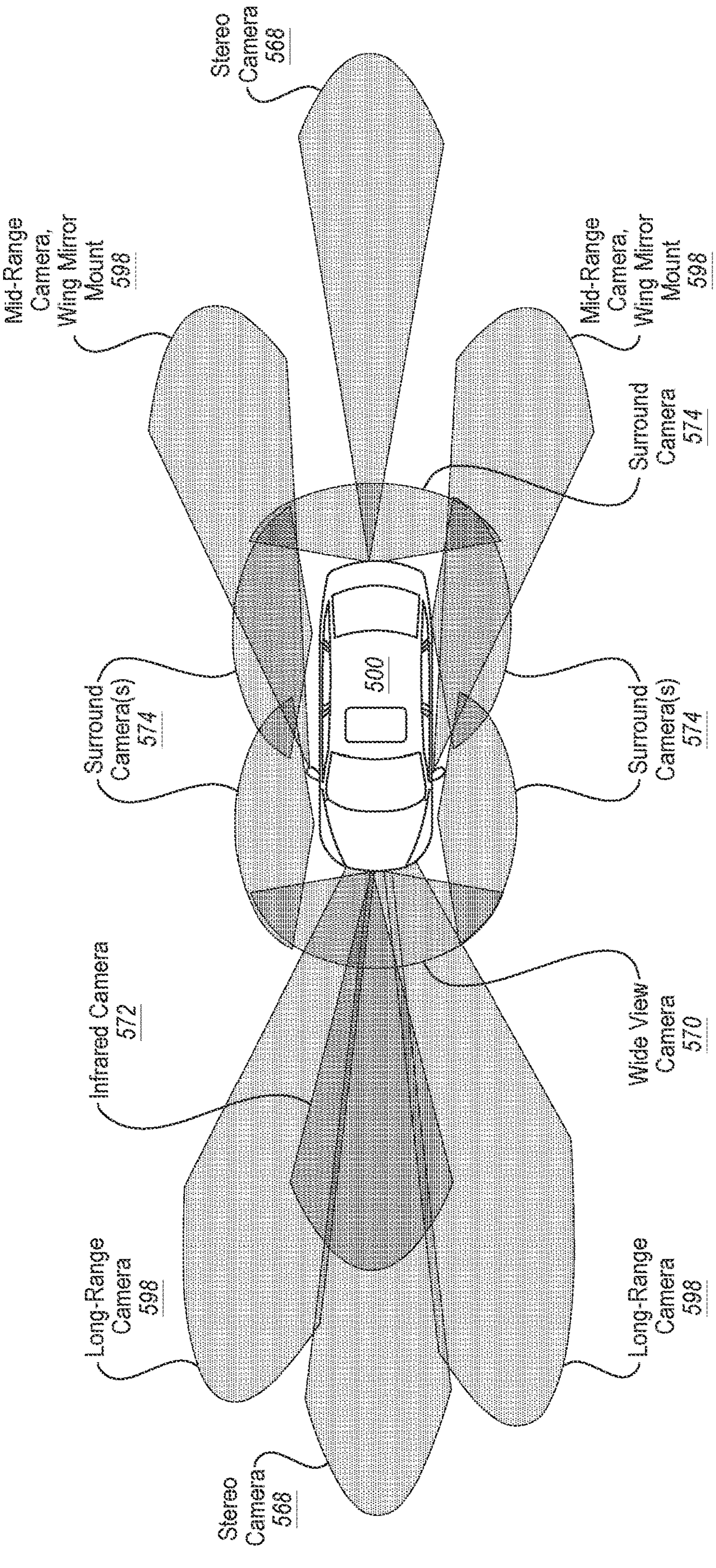
FIG. 5B is an example of camera locations and fields of view for the example autonomous vehicle of FIG. 5A, in accordance with one or more embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
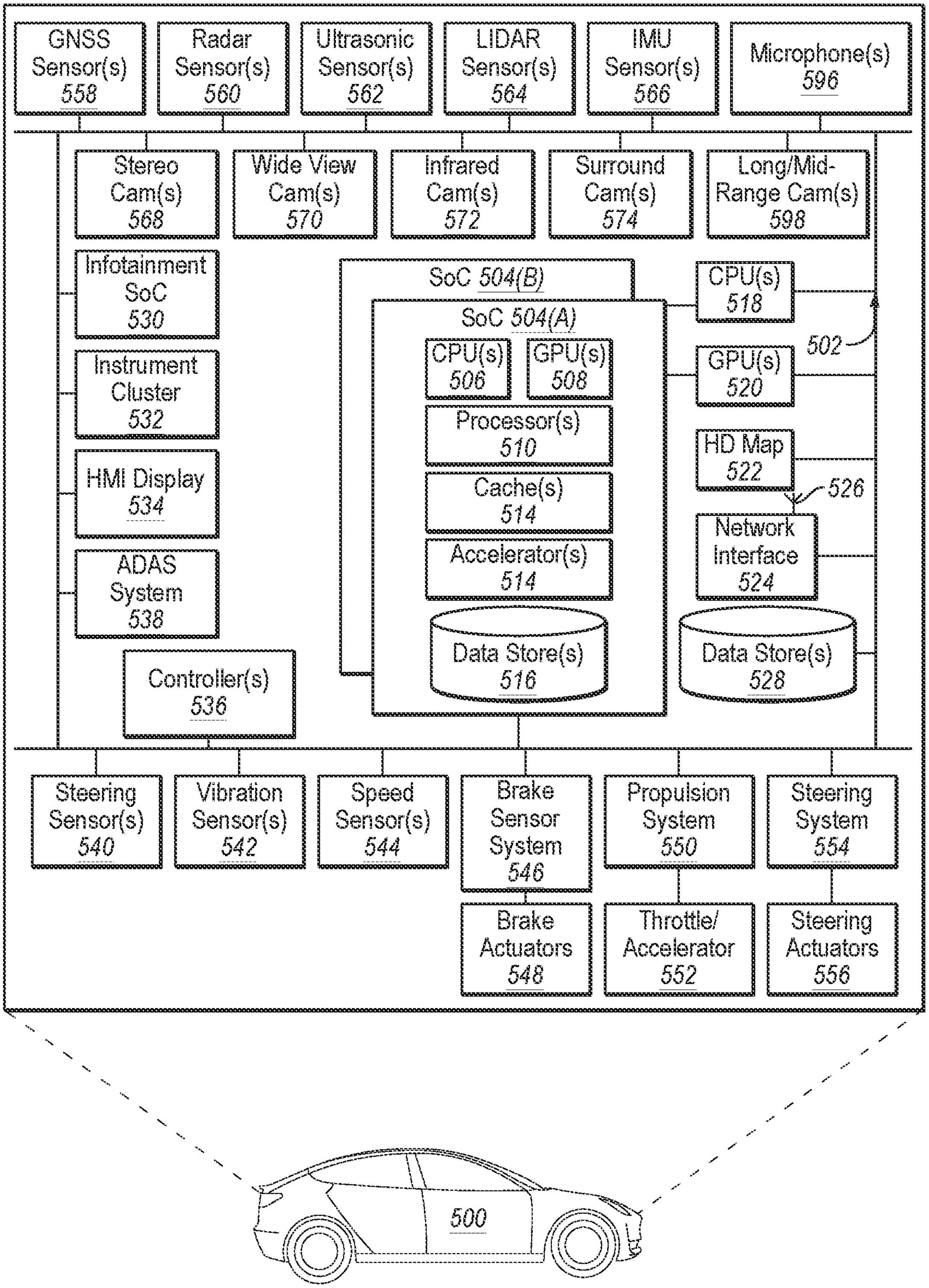
FIG. 5C is a block diagram of an example system architecture for the example autonomous vehicle of FIG. 5A, in accordance with one or more embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term “CNN,” as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s)

508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the Advanced SoC, configured to identify in-cabin events and respond accordingly. In-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPD (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surrounding at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor (s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s).

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
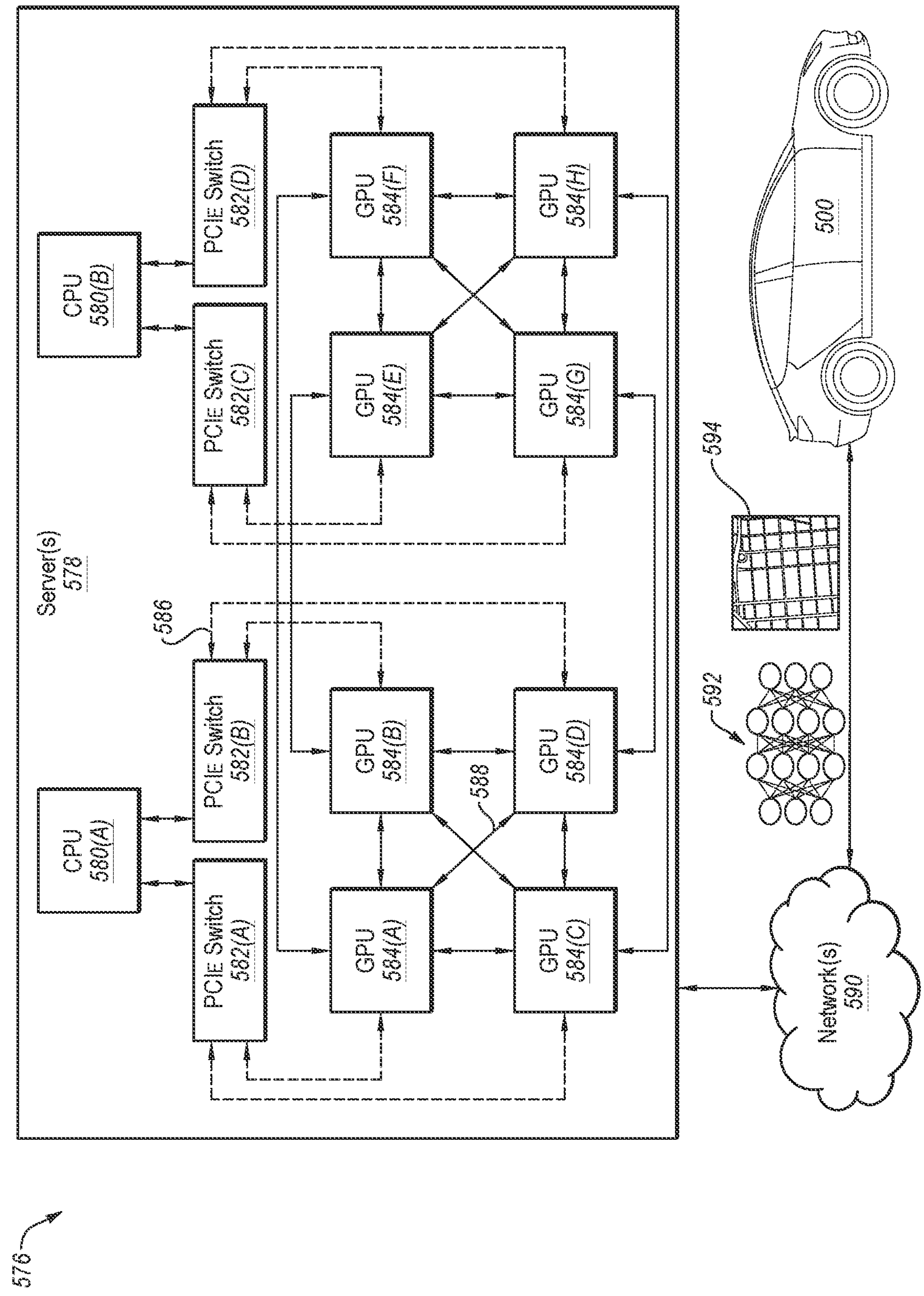
FIG. 5D is a system diagram for communication between cloud-based server(s) and the example autonomous vehicle of FIG. 5A, in accordance with one or more embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
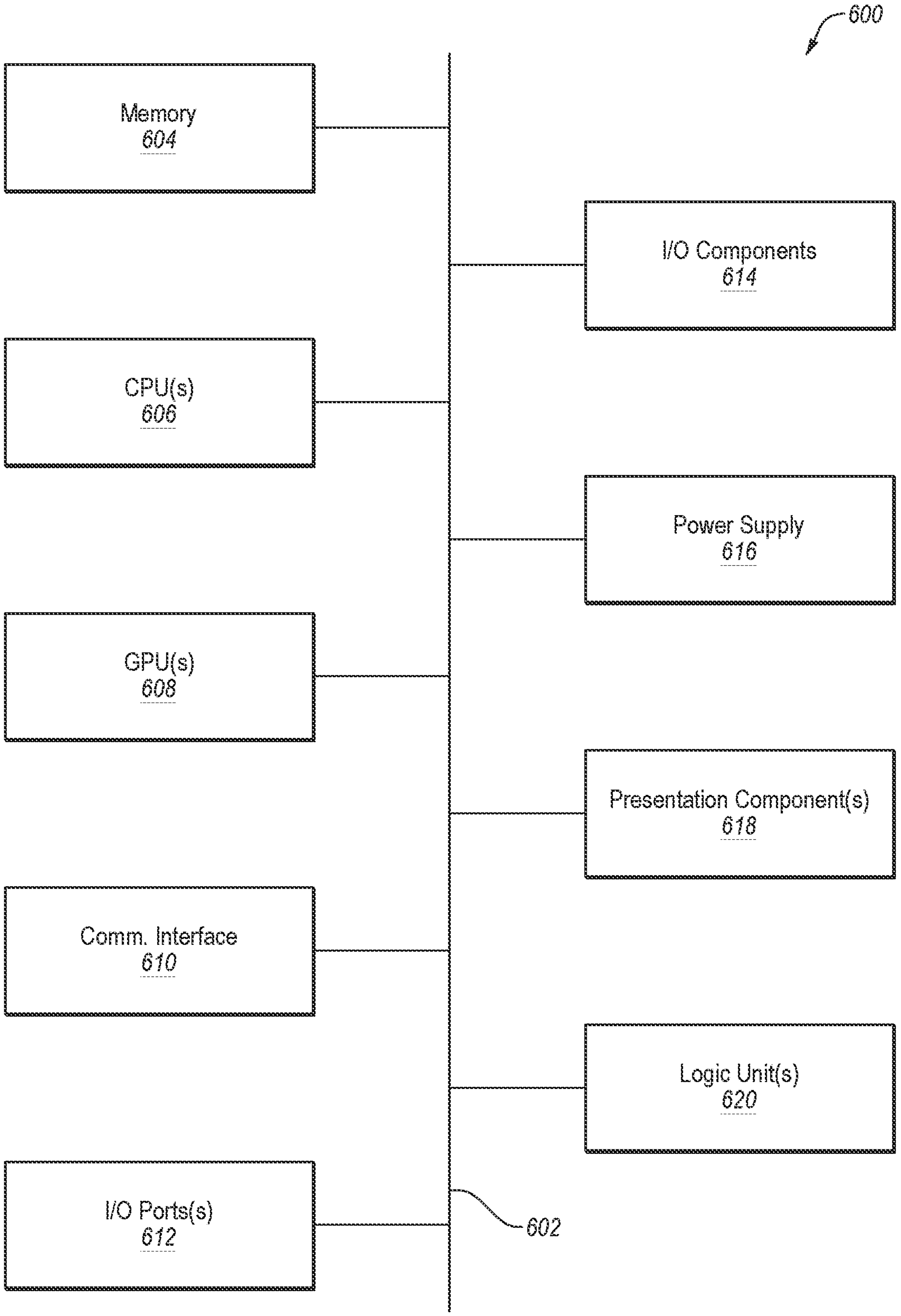
FIG. 6 is a block diagram of an example computing device suitable for use in implementing one or more embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, include wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
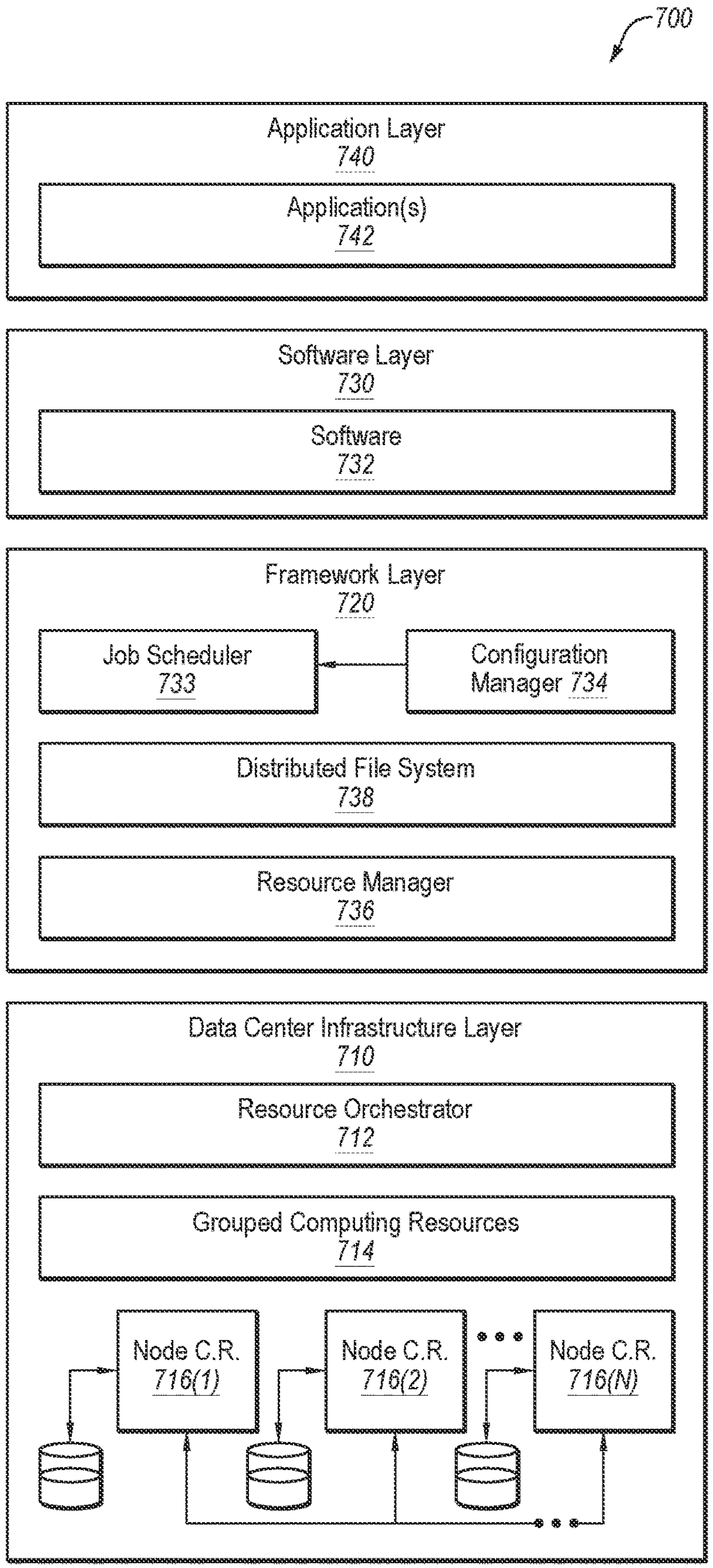
FIG. 7 is a block diagram of an example data center suitable for use in implementing one or more embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 700. In at least one embodiment, trained or deployed machine learning models corresponding to one or more neural networks may be used to infer or predict information using resources described in the present disclosure with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example The following is a non-limiting summary of some example implementations presented herein.

Example 1. A method comprising:

generating a visibility confidence model corresponding to an aggregate field of view of plurality of sensors of a machine, the visibility confidence model indicating a level of confidence in sensor data corresponding to individual sub-sections of the aggregate field of view; and performing one or more operations based at least on the visibility confidence model or the level of confidence corresponding to the individual sub-sections of the aggregate field of view.

The method included in Example 1, wherein the plurality of sensors includes sensors corresponding to one or more sensor modalities.

The method included in Example 1, wherein the respective levels of confidence are determined based at least on: one or more faults or errors associated with an individual sensor of the plurality of sensors; one or more gross-level degradations or blockages; one or more fine-level degradations corresponding to the sensor data; or one or more occlusions being present in the sensor data corresponding to the individual sub-sections of the aggregate field of view.

The method included in Example 1, wherein the one or more gross-level degradations or blockages are determined based on: weather data; temperature data; time of day; or time of year.

The method included in Example 1, wherein the one or more occlusions being present is determined based at least on historical sensor data or map data corresponding to a map.

The method included in Example 1, further comprising, prior to the performing the one or more operations:

sending, in response to a query, data corresponding to the one or more of the respective levels of confidence based on the query.

Example 2. A method comprising:

generating one or more visibility confidence models corresponding to one or more fields of view defining potential spatial coverage of sensor data corresponding to respective sensors associated with a machine;

populating one or more portions of the one or more visibility confidence models with confidence data indicating respective levels of confidence in sensor data corresponding to individual subsections of the one or more fields of view;

aggregating the respective levels of confidence in sensor data corresponding to the individual subsections of the one or more fields of view to generate a visibility confidence model corresponding to an aggregate field of view of the respective sensors associated with the machine; and performing one or more operations using the machine and based at least on the visibility confidence model.

The method included in Example 2, wherein the respective sensors include one or more sensors of one or more sensor modalities.

The method included in Example 2, wherein the one or more visibility confidence models are generated based at least on:

one or more faults or errors associated with an individual sensor of the respective sensors; one or more gross-level degradations or blockages; one or more fine-level degradations corresponding to the sensor data; or one or more occlusions being present in the sensor data corresponding to the individual sub-sections of the aggregate field of view.

The method included in Example 2, wherein the one or more gross-level degradations or blockages are determined based at least on environmental conditions affecting substantially all of the sensor data corresponding to a particular sensor.

The method included in Example 2, wherein the one or more occlusions being present in the sensor data is determined based at least on historical sensor data or map data corresponding to a map.

The method included in Example 2, further comprising:

sending, in response to a query, data corresponding to the one or more of the respective levels of confidence based on the query.

The method included in Example 2, wherein the query is generated based at least on a determination that perception results corresponding to at least two sensors are in disagreement.

Example 3. A system comprising:

one or more processors comprising processing circuitry to perform operations comprising:

generating one or more visibility confidence models corresponding to one or more fields of view of one or more sensors associated with a machine;

generating one or more perception outputs using one or more perception models;

determining one or more confidences associated with the one or more perception outputs based at least on querying the one or more visibility confidence models in view of the one or more perception outputs; and performing one or more operations using the machine based at least on the one or more confidences and the one or more perception outputs.

The system included in Example 3, wherein the one or more visibility confidence models are stored using a data structure, and a query corresponding to the querying corresponding to the data structure.

The system included in Example 3, wherein the one or more visibility confidence models are generated based at least on: one or more faults or errors associated with an individual sensor of the respective sensors; one or more gross-level degradations or blockages; one or more fine-level degradations corresponding to sensor data; or one or more occlusions being present in the sensor data corresponding to individual sub-sections of an aggregate field of view.

The system included in Example 3, wherein the one or more gross-level degradations or blockages are determined based at least on environmental conditions affecting substantially all of the sensor data corresponding to a particular sensor.

The system included in Example 3, wherein the one or more occlusions being present in the sensor data is determined based at least on historical sensor data or map data corresponding to a map.

The system included in Example 3, wherein the one or more sensors include sensors corresponding to multiple sensor modalities.

The system included in Example 3, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for presenting at least one of augmented reality content, virtual reality content, or mixed reality content;
- a system for hosting one or more real-time streaming applications;
- a system implemented using an edge device;
- a system implemented using a robot;
- a system for performing conversational AI operations;
- a system for performing one or more generative AI operations;
- a system implementing one or more large language models (LLMs);
- a system for generating synthetic data;
- a system incorporating one or more virtual machines (VMs);
- a system implemented at least partially in a data center; or
- a system implemented at least partially using cloud computing resources.

What is claimed is:

1. A method comprising:
- determining a plurality of visibility determinations individually corresponding to individual sub-sections of an aggregate field of view of a plurality of sensors of a plurality of sensor modalities of a machine;
- determining, based at least on the plurality of visibility determinations, a plurality of visibility confidence models corresponding to the plurality of sensors, individual visibility confidence models of the plurality of visibility confidence models corresponding to individual sensors of the plurality of sensors and respectively indicating individual levels of confidence in sensor data corresponding to respective sensors;
- generating, based at least on the plurality of visibility confidence models, an aggregate visibility confidence model corresponding to the aggregate field of view, the aggregate visibility confidence model indicating a level of confidence in sensor data corresponding to each individual sub-section of the aggregate field of view; and
- performing or adjusting performance of one or more operations of the machine based at least on the aggregate visibility confidence model or the level of confidence corresponding to the individual sub-sections of the aggregate field of view.

2. The method of claim 1, wherein the one or more operations are performed or adjusted based at least on different weighting for at least two different sensor modalities that are based at least on corresponding determinations of visibility for the at least two different sensor modalities.

3. The method of claim 1, wherein the respective levels of confidence are determined based at least on:
- one or more faults or errors associated with an individual sensor of the plurality of sensors;
- one or more gross-level degradations or blockages;
- one or more fine-level degradations corresponding to the sensor data; or
- one or more occlusions being present in the sensor data corresponding to the individual sub-sections of the aggregate field of view.

4. The method of claim 3, wherein the one or more gross-level degradations or blockages are determined based on:
- weather data;
- temperature data;
- time of day; or
- time of year.

5. The method of claim 3, wherein the one or more occlusions being present is determined based at least on historical sensor data or map data corresponding to a map.

6. The method of claim 1, further comprising, prior to the performing the one or more operations:
- sending, in response to a query, data corresponding to the one or more of the respective levels of confidence based on the query.

7. A method comprising:
- generating a plurality of visibility confidence models corresponding to one or more fields of view defining potential spatial coverage of sensor data corresponding to respective sensors associated with a machine, at least two visibility confidence models corresponding to different sensor modalities, individual visibility confidence models of the plurality of visibility confidence models respectively indicating levels of confidence in corresponding sensor data corresponding to respective sensor modalities;
- populating one or more portions of the plurality of visibility confidence models with confidence data indicating respective levels of confidence in sensor data corresponding to individual subsections of the one or more fields of view;
- aggregating the respective levels of confidence in sensor data corresponding to the individual subsections of the one or more fields of view to generate an aggregate visibility confidence model corresponding to an aggregate field of view of the respective sensors associated with the machine; and performing or adjusting performance of one or more operations of the machine based at least on the aggregate visibility confidence model.

8. The method of claim 7, wherein the performing or the adjusting of the performance of the one or more operations is based at least on the aggregate visibility confidence model including prioritizing sensor data corresponding to different sensor modalities differently based at least on different respective levels of confidence corresponding to the different sensor modalities.

9. The method of claim 7, wherein the plurality of visibility confidence models are generated based at least on:

one or more faults or errors associated with an individual sensor of the respective sensors;

one or more gross-level degradations or blockages;

one or more fine-level degradations corresponding to the sensor data; or one or more occlusions being present in the sensor data corresponding to the individual subsections of the aggregate field of view.

10. The method of claim 9, wherein the one or more gross-level degradations or blockages are determined based at least on environmental conditions affecting substantially all of the sensor data corresponding to a particular sensor.

11. The method of claim 9, wherein the one or more occlusions being present in the sensor data is determined based at least on historical sensor data or map data corresponding to a map.

12. The method of claim 7, further comprising:

sending, in response to a query, data corresponding to the respective levels of confidence based on the query.

13. The method of claim 12, wherein the query is generated based at least on a determination that perception results corresponding to at least two sensors are in disagreement.

14. A system comprising:

one or more processors comprising processing circuitry to perform operations comprising:

generating a plurality of visibility confidence models corresponding to one or more fields of view of a plurality of sensor modalities corresponding to a plurality of sensors associated with a machine;

generating one or more perception outputs using one or more perception models;

determining one or more confidences associated with the one or more perception outputs based at least on querying the plurality of visibility confidence models in view of the one or more perception outputs; and performing or adjusting performance of one or more operations of the machine based at least on the one or more confidences and the one or more perception outputs.

15. The system of claim 14, wherein the plurality of visibility confidence models are stored using a data structure, and the querying comprises generating a query to the data structure.

16. The system of claim 14, wherein the plurality of visibility confidence models are generated based at least on:

one or more faults or errors associated with an individual sensor of the plurality of sensors;

one or more gross-level degradations or blockages;

one or more fine-level degradations corresponding to sensor data; or one or more occlusions being present in the sensor data corresponding to individual sub-sections of an aggregate field of view.

17. The system of claim 16, wherein the one or more gross-level degradations or blockages are determined based at least on environmental conditions affecting substantially all of the sensor data corresponding to a particular sensor.

18. The system of claim 16, wherein the one or more occlusions being present in the sensor data is determined based at least on historical sensor data or map data corresponding to a map.

19. The system of claim 14, wherein the performing or the adjusting the performance of the one or more operations is based at least on the one or more confidences and the one or more perception outputs includes prioritizing sensor data corresponding to different sensor modalities differently based at least on different respective levels of confidence corresponding to different sensors.

20. The system of claim 14, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system for performing one or more generative AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

* * * * *